US011746950B2

(12) United States Patent
Dai

(10) Patent No.: US 11,746,950 B2
(45) Date of Patent: Sep. 5, 2023

(54) TELESCOPIC PIVOTABLE SUPPORT STRUCTURE, CAMERA SUPPORT DEVICE, FAN AND LAMP

(71) Applicant: Shenzhen intelliARK Technology Co., Ltd, Shenzhen (CN)

(72) Inventor: Yuncheng Dai, Shenzhen (CN)

(73) Assignee: Shenzhen intelliARK Technology Co., Ltd, Shenzhen (CN)

( * ) Notice: Subject to any disclaimer, the term of this patent is extended or adjusted under 35 U.S.C. 154(b) by 134 days.

(21) Appl. No.: 17/715,999

(22) Filed: Apr. 8, 2022

(65) Prior Publication Data

US 2022/0228702 A1    Jul. 21, 2022

Related U.S. Application Data

(63) Continuation-in-part of application No. PCT/CN2021/071464, filed on Jan. 13, 2021.

(51) Int. Cl.
| | |
|---|---|
| *F16M 11/28* | (2006.01) |
| *F04D 19/00* | (2006.01) |
| *F04D 29/64* | (2006.01) |
| *F16M 11/20* | (2006.01) |
| *F21V 21/22* | (2006.01) |

(Continued)

(52) U.S. Cl.
CPC ........... *F16M 11/28* (2013.01); *F04D 19/002* (2013.01); *F04D 29/646* (2013.01); *F16M 11/2021* (2013.01); *F21V 21/22* (2013.01); *F21V 21/26* (2013.01); *F21V 21/32* (2013.01); *G03B 15/03* (2013.01); *G03B 17/561* (2013.01); *F21Y 2105/18* (2016.08)

(58) Field of Classification Search
CPC ..... F16M 11/28; F16M 11/2021; F21V 21/22; F21V 21/26; F21V 21/32; F21V 21/14
USPC ...................... 248/165, 166, 125.8; 396/428; 362/217.01, 217.14
See application file for complete search history.

(56) References Cited

U.S. PATENT DOCUMENTS 6,202,974 B1 * 3/2001 Rellinger ............... A47B 97/08
248/165
7,514,619 B1 * 4/2009 Bruce .................... A47B 81/00
248/463

(Continued)

FOREIGN PATENT DOCUMENTS

| CN | 206759585 U | 12/2017 |
|---|---|---|
| CN | 206929520 U | 1/2018 |

(Continued)

*Primary Examiner* — Todd M Epps
(74) *Attorney, Agent, or Firm* — Rumit Ranjit Kanakia

(57) ABSTRACT

A telescopic pivotable support structure includes a telescopic connecting pipe assembly, wherein the telescopic connecting pipe assembly comprises a first pipe, a second pipe and a first pivotable connection assembly, wherein the first pivotable connection assembly comprises a first pivot part and a second pivot part, the first pivot part comprises a first pivot portion and a first connection portion connected with the first pivot portion, the first connection portion is accommodated in one end of the first pipe to be connected with the first pipe; the second pivot part comprises a second pivot portion and a second connection portion, the second connection portion is configured to be connected with the second pipe, the second pivot portion is configured to be pivotably connected with the first pivot portion.

20 Claims, 21 Drawing Sheets

(51) Int. Cl.
    *F21V 21/26*     (2006.01)
    *F21V 21/32*     (2006.01)
    *G03B 15/03*     (2021.01)
    *G03B 17/56*     (2021.01)
    *F21Y 105/18*     (2016.01)

(56) References Cited

U.S. PATENT DOCUMENTS

| | | | |
|---|---|---|---|
| 9,228,695 B2 * | 1/2016 | Cyr | F16M 11/36 |
| 9,314,652 B2 * | 4/2016 | Broadley | F16M 11/26 |
| 10,344,912 B1 * | 7/2019 | Angsutrarux | F16M 11/32 |
| D901,054 S * | 11/2020 | Zhao | D16/237 |
| D901,749 S * | 11/2020 | Chen | D16/237 |
| 11,092,279 B2 * | 8/2021 | Chen | F16M 11/2014 |
| 11,384,924 B2 * | 7/2022 | Cornell | F21S 9/02 |
| 2004/0149869 A1 * | 8/2004 | Chen | F04D 29/601 |
| | | | 248/161 |
| 2014/0003802 A1 * | 1/2014 | Fromm | F16M 11/28 |
| | | | 396/428 |
| 2019/0360671 A1 * | 11/2019 | Gall | F16M 11/041 |
| 2020/0281054 A1 * | 9/2020 | Li | F21S 9/02 |
| 2021/0380274 A1 * | 12/2021 | Suzuki | F16B 7/10 |

FOREIGN PATENT DOCUMENTS

| | | |
|---|---|---|
| CN | 206948415 U | 1/2018 |
| CN | 108224042 A | 6/2018 |
| CN | 208011260 U | 10/2018 |
| CN | 209511452 U | 10/2019 |

\* cited by examiner

TELESCOPIC PIVOTABLE SUPPORT STRUCTURE, CAMERA SUPPORT DEVICE, FAN AND LAMP

CROSS-REFERENCE TO RELATED APPLICATIONS

The application is a continuation of International Application No. PCT/CN2021/071464 filed on Jan. 13, 2021, which claims priority of Chinese patent application 202021055801.5, filed on Jun. 10, 2020, under 35 U.S.C. § 371, both applications are incorporated herein by reference in their entireties.

FIELD

The subject matter herein generally relates to support structures, and particularly relates to a telescopic pivotable support structure, a camera support device, a fan and a lamp.

BACKGROUND

Some existing support structures, such as support structures for camera support devices or support structures for small electric devices like fans and lamps, usually can be telescopic to meet requirements of different support heights or facilitate storage and carrying.

With widespread use of various devices and equipment with supporting structures, there are more and more requirements for supporting structures. In order to better match the requirements, there is a desire to constantly improve the supporting structures and further improve competitiveness of the supporting structures.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION

Figure 1:
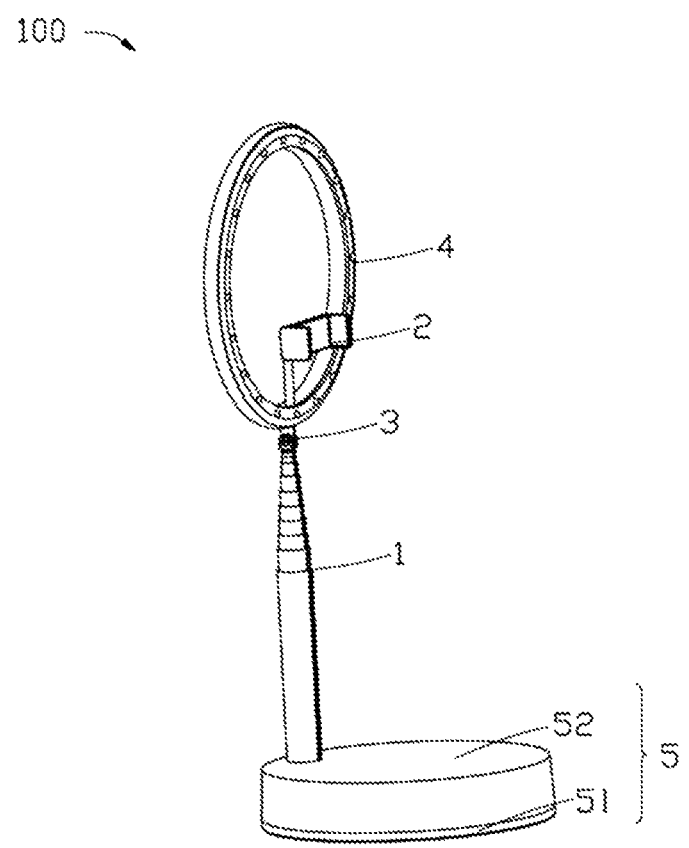
FIG. 1 is a schematic view of a camera support device with a telescopic pivotable support structure in a retracted state according to a first embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the application, "a plurality of" means two or more, unless otherwise specifically defined.

Figure 2:
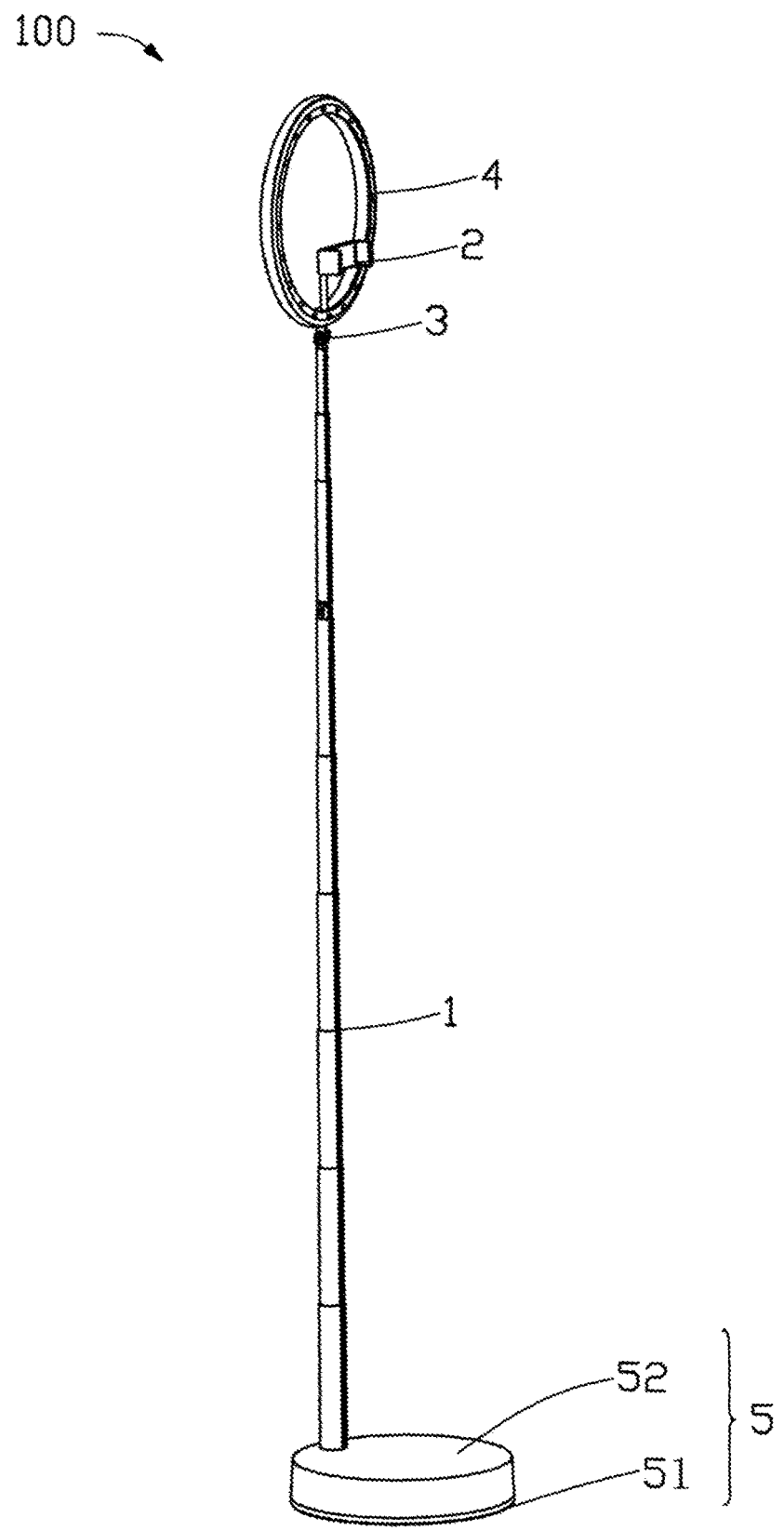
FIG. 2 is a schematic view of the camera support device of FIG. 1 in a support state.
Figure 3:
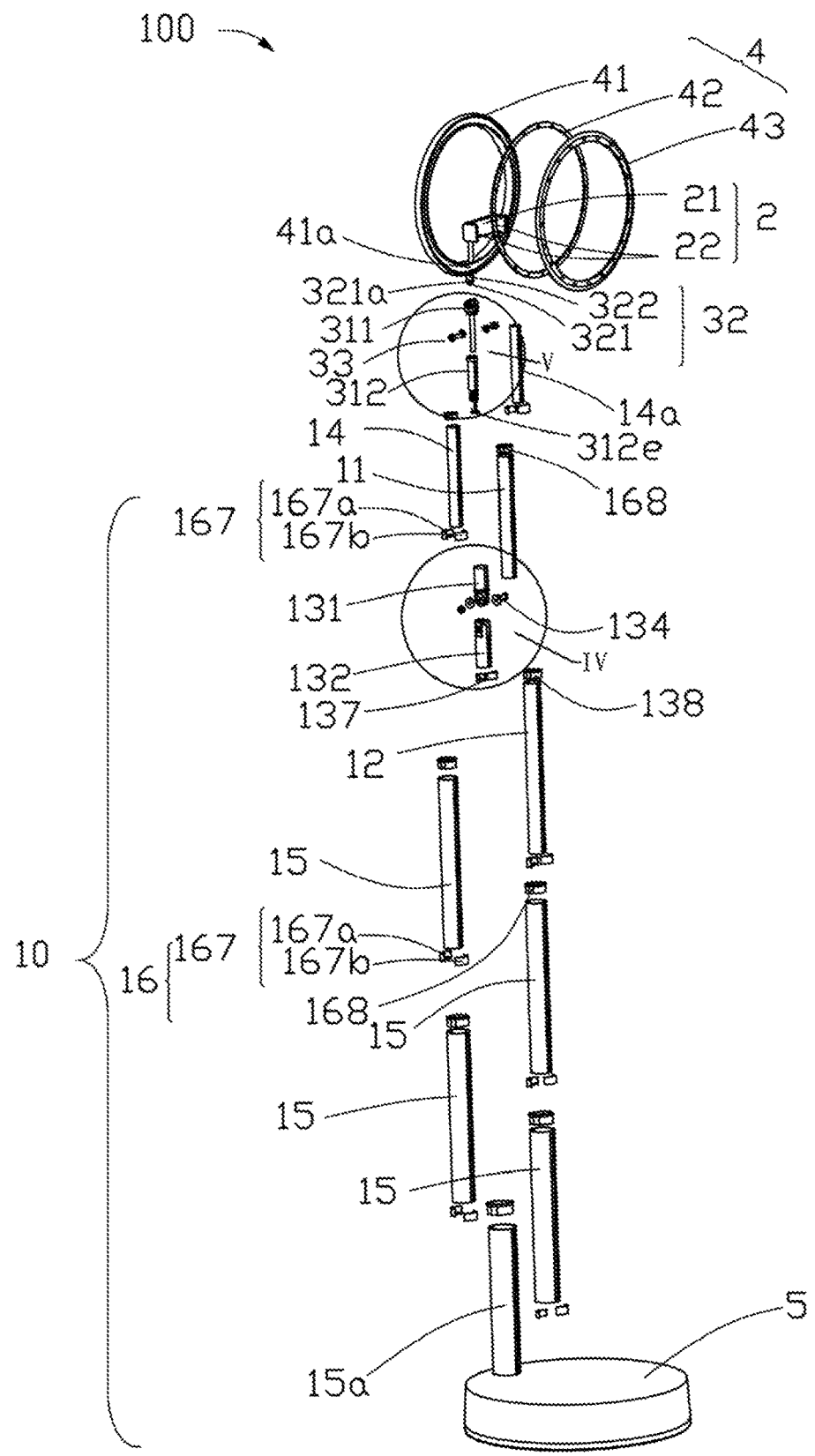
FIG. 3 is an exploded view of the camera support device of FIG. 2.
Figure 4:
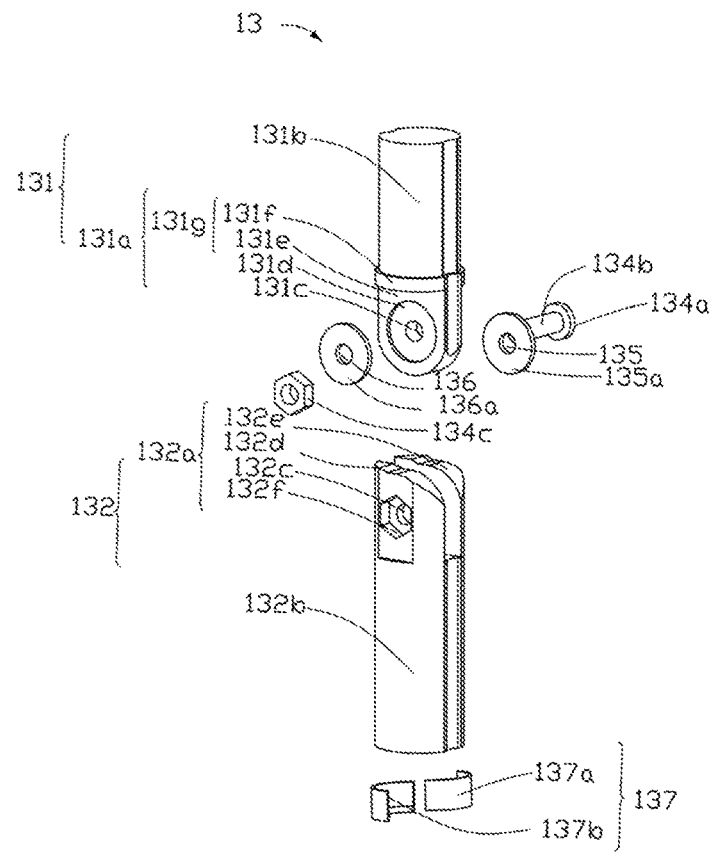
FIG. 4 is an enlarged view of the portion IV shown in FIG. 3.
Figure 5:
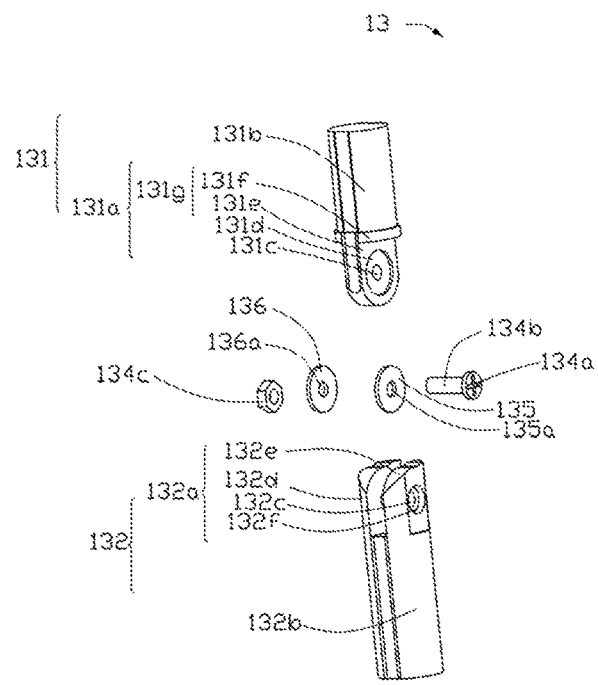
FIG. 5 is a schematic view of the portion IV shown in FIG. 4 taken from another view.
Figure 6:
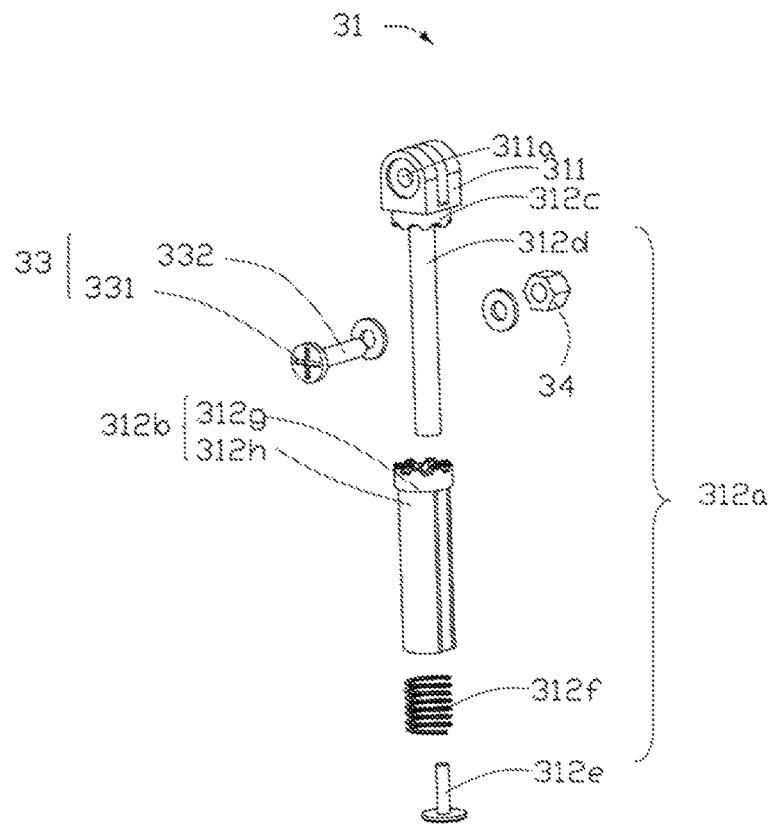
FIG. 6 is an enlarged view of the portion V shown in FIG. 3.
Figure 7:
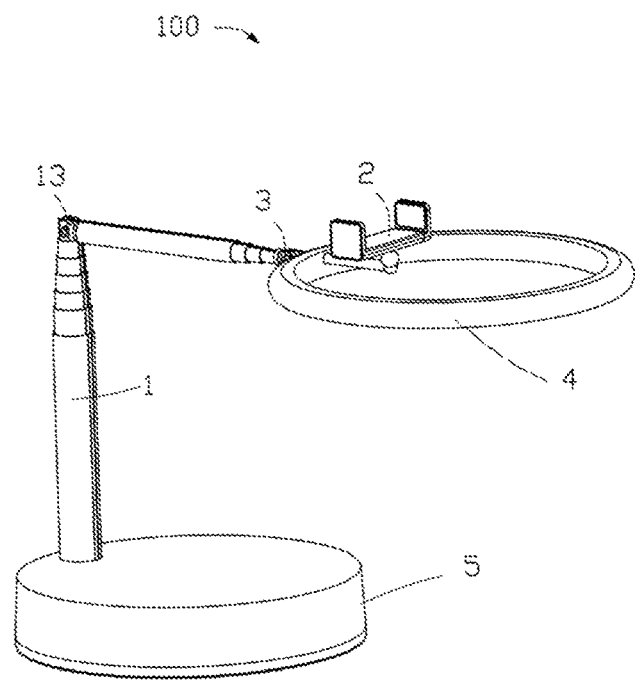
FIG. 7 is a schematic view of the camera support device of FIG. 1 in a pivot state.
Figure 8:
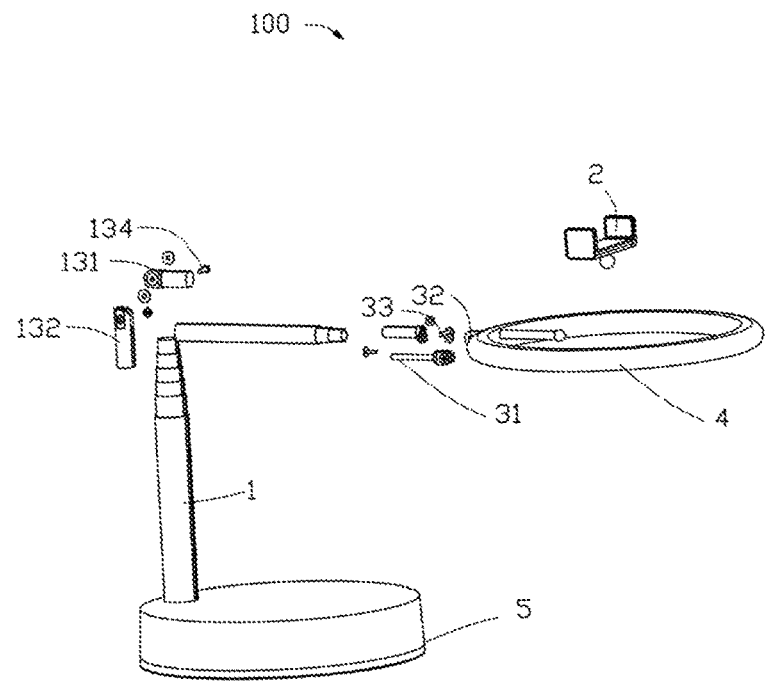
FIG. 8 is an exploded view of the camera support device of FIG. 7.

Referring to FIGS. 1-8, FIG. 1, FIG. 1 is a schematic view of a camera support device 100 with a telescopic pivotable support structure 1 in a retracted state according to a first embodiment of the present disclosure. FIG. 2 is a schematic view of the camera support device 100 of FIG. 1 in a support state. FIG. 3 is an exploded view of the camera support device 100 of FIG. 2. FIG. 4 is an enlarged view of the portion IV of the camera support device 100 shown in FIG. 3. FIG. 5 is a schematic view of the portion IV shown in FIG. 4 taken from another view. FIG. 6 is an enlarged view of the portion V of the camera support device 100 shown in FIG. 3. FIG. 7 is a schematic view of the camera support device 100 of FIG. 1 in a pivot state. FIG. 8 is an exploded view of the camera support device 100 of FIG. 7. The camera support device 100 of the first embodiment of the present disclosure may include a holding structure 2 and a support structure 1. The holding structure 2 is configured to hold a camera device, such as a mobile phone, a camera, a pad, and etc. The support structure 1 is configured to support the holding structure 2.

In the first embodiment, the support structure 1 includes a telescopic connecting pipe assembly 10, which includes a first pipe 11, a second pipe 12 and a first pivotable connection assembly 13. The first pivotable connection assembly 13 includes a first pivot part 131 and a second pivot part 132, the first pivot part 131 includes a first pivot portion 131a and a first connection portion 131b connecting the first pivot portion 131a, and the first connection portion 131b is accommodated at one end of the first pipe 11 to connect with the first pipe 11. The second pivot part 132 includes a second pivot portion 132a and a second connection portion 132b connecting the second pivot portion 132a. The second connection portion 132b connects the second pipe 12. The second pivoting portion 132a is pivoted with the first pivot portion 131a, so that the support structure 1 can be retracted and pivot. The telescopic pivotable support structure 1 includes a support state, pivot state and retracted state, so that a camera device supported on the camera support device 100 can be in different heights, angles and positions, etc.

In the retracted state, the first pipe 11, the first pivot portion 131a, the second pivot portion 132a can be substantially accommodated in the second pipe 12 so that make a volume of the whole support structure 1 retracted to a volume of the second pipe 12. In the retracted state, the camera support device 100 can be located on a table for supporting a camera device, especially for broadcast live.

In the support state, the first pipe 11 and the second pipe 12 extends in a same direction, at least part of the first pipe 11 extends out of the second pipe 12. Specifically, in at least one embodiment, in the support state, one part of the first pipe 11 extends out of the second pipe 12, the other part of the first pipe 11, the first pivot portion 131a and the second pivot portion 132a are accommodated in the second pipe 12. In at least one embodiment, in the support state, the first pipe and the first pivot portion 131a can extend out of the second pipe 12, while the second pivot portion 132a can be accommodated in the second pipe 12. In at least one embodiment, the first pipe 11, the first pivot portion 131a and the second pivot portion 132a can extend out of the second pipe 12.

In the first embodiment, the first connection portion 131b is accommodated in one end of the first pipe 11 so as to be connected with the first pipe 11. The second connection portion 132b can be accommodated in the second pipe 12 so as to be connected with the second pipe 12. In the support state, the camera support device 100 can be supported on the ground to support a camera device, which allows a user to freely adjust a height of the support structure 1 according to an object to be photographed.

The first connection portion 131b can be accommodated in the first pipe 11. The first connection portion 131b and the first pipe 11 can be made separately from the first pipe 11, which can realize standardized production of the first pipe 11. In addition, more pipes can be added according to actual requirements. The material for the first pivot part 131, the second pivot part 132 can be different from that for the first pipe 11 and the second pipe 12, which can reduce manufacture cost and improve manufacture efficiency so as to improve competitivity of the support structure. The second connection portion 132b can be accommodated in the second pipe 12. The second connection portion 132b can be made separately from the second pipe 12, which can realize standardized production of the second pipe 12. In addition, more pipes can be added according to actual requirements. The material for the first pivot part 131, the second pivot part 132 can be different from that for the first pipe 11 and the second pipe 12, which can reduce manufacture cost and improve manufacture efficiency so as to improve competitivity of the support structure. Furthermore, the first connection portion 131b is accommodated in the first pipe 11, the second connection portion 132b is accommodated in the second pipe 12, which makes the appearance of the support structure more beautiful.

The first connection portion 131b is accommodated in the first pipe 11, and the first connection portion 131b is arranged separately from the first pipe 11, which allows a first connecting pipe assembly 14 to pass through the first pipe 11 to be connected with an end of the first pipe away from the second pipe 12. The second connection portion 132b is accommodated in the second pipe 12, and the second connection portion 132b and the second pipe 12 is arranged separately from the second pipe 12, which allows the second pipe 12 and the second pivot part 132 to pass through a second connecting pipe assembly 15 to be connected with an end of the second pipe 12 away from the first pipe 11. Therefore, through the first and second connecting pipe assemblies 14 and 15, the length of the telescopic connecting pipe assembly can be increased, and the position pivotable of the telescopic connecting pipe assembly 10 can be adjusted to meet different application scenarios. Specifically, the first pipe 11 and the second pipe 12 can be replaced with standard pipes available in current market, which do not need to design different molds for pipes and reduce manufacture cost.

The rigidity of the first pivot part 131 and the second pivot part 132 is greater than that of the first pipe 11 and the second pipe 12. When the first pivot part 131 and the second pivot part 132 are pivot to be connected together, they both bear large external forces. By making the rigidity of the first pivot part 131 and the second pivot part 132 greater than that of the first pipe 11 and the second pipe 12, deformation problems caused by the large external force of the first pivot part 131 and the second pivot part 132 can be reduced and service life of the support device can be improved. In addition, the first pipe 11, the second pipe 12, and the connecting pipe assemblies 14 and 15 can be made of aluminum, which can not only be the standard parts commonly available in the market, but also have low weight while ensuring support and telescopic functions, which is conducive to the lightweight of the support device.

In at least one embodiment, the first pivot part 131 and the second pivot part 132 can made of stainless steel. In other embodiments, outer parts of the first pivot part 131 and the second pivot part 132 can be made of stainless steel while inner parts of the first pivot part 131 and the second pivot part 132 can be made of plastic.

Except for the first pipe 11 and the second pipe 12, in order to increase a telescopic range of the support structure and improve application scenes of the camera support device 100, the pipe assembly 10 of the support structure 1 may further include a number of connecting pipe assemblies 14 and 15 and a connecting assembly 16 connected between two adjacent connecting pipes. Specifically, the first connecting pipe assembly 14 is telescopically connected to the end of the first pipe 11 away from the second pipe 12, and the second connecting pipe assembly 15 is telescopically connected to the end of the second pipe 12 away from the first pipe 11. A connecting assembly 16 can be correspondingly arranged between two adjacent pipes (such as between the first pipe 11 and the first connecting pipe assembly 14, between two adjacent first connecting pipe assemblies 14, between the second pipe 12 and the second connecting pipe assembly 15, and between two adjacent second connecting pipe assemblies 15), so as to realize a telescopic connection between the two adjacent pipes.

In addition, between the two adjacent pipes, an inner diameter of a lower pipe (i.e. the pipe away from the holding structure 2) is slightly larger than the outer diameter of the upper pipe (i.e. the pipe adjacent to the holding structure 2), so that the upper pipe can be retracted into or extend out of the lower pipe. Specifically, the connecting assembly 16 may include a limit sleeve 168 installed on the lower pipe and at least one position member 167 clamped between the outer wall of the upper pipe and the inner wall of the lower pipe. In this embodiment, at least one position member 167 is arc-shaped. The at least one position member 167 includes a first position member 167a and a second position member 167b arranged opposite to the first position member 167a. One of the first position member 167a and the second position member 167b is a plastic positioning piece, and the other of the first position member 167a and the second position member 167b is a metal positioning piece. The limit sleeve 168 is configured to prevent the upper pipe from separating from the lower pipe.

In the pivot state, among the first pipe 11, the first pivot portion 131a and the second pivot portion 132a, at least the first pipe 11 extends out of the second pipe 12. The first pivot portion 131a and the second pivot portion 132a pivot relative to each other to be connected together at a preset bending angle, and then the first pipe 11 and the second pipe 12 are connected together through the first pivotable connection assembly 13 in a pivot state. In other embodiments, in the pivot state, all the first pipe 11, the first pivot portion 131a and the second pivot portion 132a can extend out of the second pipe 12. In the pivot state, the camera support device 100 can allow the camera device held by the holding structure 2 to take photographs at any required angle by the user by adjusting a pivot connection angle (the angle of the first pivot portion 131a relative to the second pivot portion 132a) which is more convenient for use, thereby improving user experience.

In at least one embodiment, in the pivot state, the pivot-connection angle between the first pivot portion 131a and the second pivot portion 132a (that is the preset bending angle and is equals to an angle between the first pipe 11 and the second pipe 12) may be 90 degrees, which allows the camera device held on the holding structure 2 to shoot objects on a horizontal surface like a table surface or the ground, such as papers or documents. However, in other embodiments, the pivot connection angle between the first pivot portion 131a and the second pivot portion 132a is not limited to 90 degrees, and can be 70 degrees, 80 degrees, 110 degrees or 120 degrees according to actual requirements. In addition, in some embodiments, by setting pivoting friction between the first pivot portion 131a and the second pivot portion 132a, the pivot connection angle between the first pivot portion 131a and the second pivot portion 132a can be adjusted in a range of 0-180 degrees to meet the user's requirements for shooting at different pivot angles.

Referring to FIG. 7, the pivot connection between the first pivot portion 131a and the second pivot portion 132a can be: the first pivot portion 131a bends towards a first direction (for example, a right side shown in FIG. 7), so as to form the pivot connection with the second pivot portion 132a (for example, a pivot connection at a 90 degree angle); or the first pivot portion 131a bends towards a second direction (for example, a left side shown in FIG. 7), so as to form the pivot connection with the second pivot portion 132a (for example, a pivot connection at a 90 degree angle), thereby meeting different shooting requirements at different positions or angles.

The first pivot portion 131a may include a pivot hole 131c, the second pivot portion 132a may include a pivot hole 132c. The first pivotable connection assembly 13 further includes a first pivot shaft 134. The first pivot shaft 134 passes through the pivot hole 131c of the first pivot portion 131a and the pivot hole 132c of the second pivot portion 132a to pivotably connect the first pivot portion 131a and the second pivot portion 132a together. The first pivot shaft 134 includes a first cap 134a and a first shaft 134b connected with the first cap 134a. The first shaft 134b passes through the pivot hole 131c of the first pivot portion 131a and the pivot hole 132c of the second pivot portion 132a. The first pivotable connection assembly 13 further includes a first fastener 134c. The first fastener 134c is fixed at one end of the first shaft 134b away from the first cap 134a. Therefore, the first fastener 134c and the first cap 134a fix the first pivot portion 131a and the second pivot portion 132a therebetween.

One of the first pivot portion 131a and the second pivot portion 132a includes a first base 132d and a second base 132e opposite to the first base 132d, at least part of the other one of the first pivot portion 131a and the second pivot portion 132a is arranged between the first base 132d and the second base 132e. In the embodiment, the second pivot portion 132a includes the first base 132d and the second base 132e opposite to the first base 132d, and at least part of the first pivot portion 131a is arranged between the first and second bases 132d and 132e. Each of the first and second bases 132d and 132e defines a pivot hole 132c. The first pivot shaft 134 passes through the pivot hole 132c of the first base 132d, the pivot hole 131c and the pivot hole 132c of the second base 132e to pivotably connect the first pivot portion 131a and the second pivot portion 132a together. At least part of the first pivot portion 131a is clamped and limited by the first base 132d and the second base 132e, and the first pivot portion 131a and the second pivot portion 132a are pivotably connected by the first pivot shaft 134, which ensures stability of the first pivotable connection assembly 13 during a bending process.

The pivotable connection between the first pivot portion 131a and the second pivot portion 132a is not limited to above embodiments. There may be a variety of modified embodiments, as long as a pivotable connection (or rotatable connection) between the first pivot portion 131a and the second pivot portion 132a can be realized. There are too many modified embodiments to list one by one.

In at least one embodiment, the first pivotable connection assembly 13 may further includes a first pad 135 having a first through hole 135a and a second pad 136 having a second through hole 136a. The other one of the first pivot portion 131a and the second pivot portion 132a defines two grooves 131d communicating with the second pivot hole 132c at two sides thereof respectively. In the embodiment, the first pivot portion 131a defines two grooves 131d communicating with the second pivot hole 132c at two sides thereof respectively. The first pad 135 and the second pad 136 are respectively accommodated in the two grooves 131d. The first pivot shaft 134 passes through the second pivot hole 132c of the first base 132d, the first through hole 135a, the pivot hole 131c of the first pivot portion 131a, the second through hole 136a into the pivot hole 132c of the second base 132e to connect the first pivot portion 131a and the second pivot portion 132a together. The first pad 135 and the second pad 136 helps to reduce pivot friction between the first pivot portion 131a and the second pivot portion 132a, which facilitates bending of the first pivotable connection assembly 13 and improves strength of the pivot connection between the first pivot portion 131a and the second pivot portion 132a.

In at least one embodiment, the second base 132e defines a first accommodating groove 132f communicating with the second pivot hole 132c of the second base 132e at a side thereof away from the first base 132d. The first fastener 134c is accommodated in the first accommodating groove 132f so that the first fastener 134c and the second base 132e can be integrated to a single part, which cannot interference with the second pivot portion 132a during the bending process. The first pivot portion 131a includes a body 131e and a limit portion 131f connected between the body 131e and the first connection portion 131b. The body 131e is pivotably connected with the second pivot portion 132a. The limit portion 131f together with the first connection portion 131b forms a step structure 131g. The first connection portion 131b is accommodated in the first pipe 11 and the end of the first pipe 11 resists against the limit portion 131f. During a telescopic process of the support structure 1, the step structure 131g can limit the first pipe 11.

The first pivotable connection assembly 13 further includes at least one positioning member 137 arranged between the second connection portion 132 and an inner wall of the second pipe 12. The positioning member 137 is configured to adjust friction between the second pipe and the second pivot portion 132b. The at least one positioning member 137 can be arc-shaped. In at least one embodiment, the at least one positioning member 137 includes a first positioning member 137a and a second positioning member 137b opposite to the first positioning member 137a. The first positioning member 137a is arranged opposite to the second positioning member 137b and the first positioning member 137a together with the second positioning member 137b adjusts the friction between the second pipe and the second pivot portion 132b. In order to achieve a relatively appropriate friction force, one of the first positioning member 137a and the second positioning member 137b can be plastic, and the other of the first positioning member 137a and the second positioning member 137b can be metal.

The first pivotable connection assembly 13 further includes a stop sleeve 138 sleeved on the end of the second pipe 12 away from the first pipe 11. The stop sleeve 138 sleeves on an outer periphery of the second connection portion 132b to prevent the second connection portion 132b from detaching from the second pipe 12. In the embodiment, when the number of the first pipe 11, the second pipe 12 is two or more, the number of the poisoning member 137, the stop sleeve 138 can be two or more. Each adjacent two first pipes 11 or each adjacent two second pipes 12 can be limited by a group of one positioning member 137 and one stop sleeve 138, which can prevent the two first pipes 11 or the two second pipes 12 separating from each other.

In the embodiment, the camera support device 100 further includes a second pivotable connection assembly 3. The second pivotable connection assembly 3 is connected between the support structure 1 and the holding structure 2 to make the holding structure 2 can rotate relative to the support structure 1. The second pivotable connection assembly 3 includes a third pivot part 31 and a fourth pivot part 32. The third pivot part 31 includes a third pivot portion 311 and a third connection portion 312 connected with the third pivot portion 312. The third pivot portion 312 is connected with the support structure 1. The fourth pivot part 32 includes a fourth pivot portion 321 and a fourth connection portion 322 connected with the fourth pivot portion 321. The third pivot portion 311 is pivotably connected with the fourth pivot portion 321. The fourth connection portion 322 is connected with the holding structure 2. Specifically, the third pivot portion 311 is pivotably connected with the fourth pivot portion 321, which allows the third pivot portion 311 to rotate relative to the fourth pivot portion 321 to achieve a pivot connection between the first pivot portion 311 and the second pivot portion 312 at different angles. Therefore, an angle between the holding structure 2 connected with the fourth pivot portion 322 and the support structure 1 connected with the third pivot portion 311, thereby, adjusting shooting angles of the camera device held on the holding structure 2.

The third pivot portion 311 includes a third pivot hole 311a, the fourth pivot portion 321 includes a fourth pivot hole 321a. The second pivotable connection assembly 3 further includes a second pivot shaft 33. The second pivot shaft 33 passes through the third pivot hole 311a of the third pivot portion 311 and the fourth pivot hole 321a of the fourth pivot portion 321 to pivotably connect the third pivot portion and the fourth pivot portion together. The second pivot shaft 33 includes a second cap 331 and a second shaft 332 connected with the second cap 331. The second shaft 332 passes through the third pivot hole 311a of the third pivot portion 311 and the fourth pivot hole 321a of the fourth pivot portion 321. The second pivotable connection assembly 3 further includes a second fastener 34. The second fastener 34 is fixed at one end of the second shaft 332 away from the second cap 321. Therefore, the second fastener 34 and the second cap 331 fixes the third pivot portion 311 and the fourth pivot portion 321 therebetween. The pivotable connection between the third pivot portion 311 and the fourth pivot portion 321 is not limited to above embodiments. There may be a variety of modified embodiments, as long as a pivotable connection (or rotatable connection) between the third pivot portion 311 and the fourth pivot portion 321 can be realized. There are too many modified embodiments to list one by one.

In at least one embodiment, the third connection portion 312 further includes a first rotatable portion 312a connected with the third pivot portion 311 and a second rotatable portion 312b connected with the support structure 1. The first rotatable portion 312a and the second rotatable portion 312b is rotatably connected, which allows the third connection portion 312 brings the third pivot portion 311, the fourth pivot part 32, and the holding structure 2 rotate around an axis defined by an extension direction of the second pipe 12. The user can adjust a rotate angle of the holding structure 2 to make the camera device shoot objects at different orientation, which is convenient for the user to use, thereby improving user experience.

Specifically, the first rotatable portion 312a and the second rotatable portion 312b are rotatably connected, which makes the third connection portion 312 brings the third pivot portion 311, the fourth pivot part 32, and the holding structure 32 to rotate around the axis defined by the extension direction of the second pipe within a range from 0 to 360 degrees. Preferably, the holding structure 2 rotates 180 degrees around the axis defined by the extension direction of the second pipe, the user can switch front/back camera of the camera device to take photos; the holding structure 2 rotates 360 degrees around the axis defined by the extension direction of the second pipe, the camera device is rotated to the original position to take photos.

In the embodiment, the first connecting pipe assembly 14 includes a first connecting pipe 14a adjacent to the holding structure 2. The first connecting pipe 13a connects with the third connection portion 312. The first rotatable portion 312a includes a clamping portion 312c connected with the third pivot portion 311, a rod portion 312d connected with the clamping portion 312c away from the third pivot portion 311, a fixing portion 312e arranged at one end of the first rotatable portion 312a away from the clamping portion 312c and connected with the rod portion 312d, and an elastic element 312f. The second rotatable portion 312b sleeves on the rod portion 312d and meshes with the clamping portion 312c. The elastic element 312f is clamped between the fixing portion 312e and the second rotatable portion 312b. The second rotatable portion 312b includes a limit end 312g and a pipe portion 312h connected with the limit end 312g. The limit end 312g is meshed with the clamping portion 312c. The pipe portion 312h together with the limit end 312g forms a step portion. The first connecting pipe assembly 14 accommodates the fixing portion 312e and the pipe portion 312h. An end of the first connecting pipe 14a resists against the limit end 312g so as to limit the first connecting pipe 14a.

In above embodiments, the first connecting pipe 14a connects the third connection portion 312. However, in a modified embodiment, the telescopic connecting pipe assembly 10 may not include the first connecting pipe assembly 14 and the first connecting pipe 14a, one end of the first pipe 11 away from the first pivot part is further configured to connect the third connection portion 312. The first rotatable portion 312a includes a clamping portion 312c connected with the third pivot portion 311, a rod portion 312d connected with the clamping portion 312c away from the third pivot portion 311, a fixing portion 312e arranged at one end of the first rotatable portion 312a away from the clamping portion 312c and connected with the rod portion 312d, and an elastic element 312f The second rotatable portion 312b sleeves on the rod portion 312d and meshes with the clamping portion 312c. The elastic element 312f is clamped between the fixing portion 312e and the second rotatable portion 312b. The second rotatable portion 312b includes a limit end 312g and a pipe portion 312h connected with the limit end 312g. The limit end 312g is meshed with the clamping portion 312c. The pipe portion 312h together with the limit end 312g forms a step portion. The first connecting pipe assembly 14 accommodates the fixing portion 312e and the pipe portion 312h. An end of the first pipe 11 resists against the limit end 312g so as to limit the first pipe 11.

The camera support device 100 further includes a lighting assembly 4. The lighting assembly 4 is connected with the fourth pivot portion 321. The fourth pivot portion 321 can bring the holding structure 2 and the lighting assembly 4 to rotate relative to the third pivot part 31 and the support structure 1. During a shooting process of the camera device, the lighting assembly 4 can provide auxiliary light source to provide users with a better shooting environment and shooting effect. Specifically, the lighting assembly 4 may include a support member 41, a lighting member 42, and a lampshade 43. The support member 41 is connected with the fourth pivot part 32. The lighting member 42 is arranged on the support member 41, and includes a circuit board and a lighting element (for example, a light emitting diode). The lamp shade 43 is arranged on one side of the lighting member 42 away from the support member 41. The support member 41, the lighting member 42 and the lamp shade 43 each have a circular structure. The support member 41 includes a fixing part 41a. The fixing part 41a is part of the circular structure of the support member 41 and two opposite sides of the fixing part 41a are respectively connected with the fourth pivot portion 321 and the fourth connection portion 322. The holding structure 2 is arranged in the circular structure of the support member 41. The holding structure 2 may include a support panel 21 and a clamping part 22 connected with the support panel 21 extending along a first direction. The lighting member 42 is configured to emit light in the first direction.

In the embodiment, the connecting pipe assembly 15 further includes a second connecting pipe 15a away from the holding structure 2. The camera support device 100 further includes a support base 5. The second connecting pipe 15a is arranged on the support base 5. The support base 5 includes a first support base 51 and a second support base 52. The second support base 52 is arranged between the first support base 51 and the holding structure 2. The second connecting pipe 15a is arranged on the second support base 52. The support base 5 can provide stable support for the camera support device 100 so as to stabilize shooting.

In above embodiments, the second connecting pipe 15a is mounted on the support base 5. However, in at least one modified embodiment, the pipe assembly 10 can not include the second connecting pipe assembly 15 and the second connecting pipe 15a, and the second pipe 12 is mounted on the support base 5. The support base 5 includes a first support base 51 and a second support base 52, the second support base 52 is arranged between the first support base 51 and the holding structure 2. The second pipe 12 is mounted on the second support base 52. The support base 5 can provide stable support for the camera support device 100 so as to stabilize shooting.

Referring to FIGS. 1, 2 and 7, the three states (retracted state, support state, and pivot state) of the support structure 1 of the camera support device 100 will be illustrated. As shown in FIG. 1, when the support structure 1 is in the retracted state, the pipes 15, 12, 11 and 14 of the pipe assembly 10 can be retracted in turn, so that most of the plurality of pipes 15, 12, 11, 14 and 14a located above the second connecting pipe 15a are retracted in the lowest pipe 15a. At this time, a support height of the support structure 1 is relatively small, which is convenient for storage, carrying, etc. of the camera support device 100, It can also be applied to photographing or lighting by placing the camera support device 100 on the desktop. In particular, in the retracted state, the first pipe 11, the second pipe 12 and the first pivotable connection assembly 13 can be retracted into the lowest pipe 15a, and the first pipe 11, the second pipe 12 and the first pivotable connection assembly 13 can further achieve effects of being hidden, not easy to be damaged and beautiful.

When the support height of the support structure 1 needs to be adjusted, at least part of the pipes of the pipe assembly 10 can be extended, so that the support height of the support structure 1 is increased. Specifically, as shown in FIG. 2, when the pipes are fully extended, the support structure 1 can reach the greatest support height. However, when it is not necessary to apply the highest support height, it can make part of the pipes partially extended or part of the pipes fully extended, without making all the pipes fully extend.

When it is necessary to adjust the support structure 1 so that the camera device on the holding structure 2 can aim at the object on the horizontal support surface (such as desktop and the ground), at least part of the second pipe 12 can be pulled out, the first pipe 11 can be pulled out of the second pipe 12, and the first pivot part, the first pipe 11 and the connecting pipe assembly 14 connected with the first pipe 11 and the holding structure 2 connected with the first connecting pipe 14a can be pivot by an external force. The first pivot part drives the first pipe 11, the connecting pipe assemblies 14 connected to the first pipe and the holding structure 2 connected to the first connecting pipe 14a to rotate (can rotate towards either one of the left side or right side) relative to the second pivot part, the second pipe 12 and the second connecting pipe assembly 15, so as to facilitate the camera device on the holding structure 2 to shoot objects on the horizontal support surface (such as desktop and the ground). At this time, the position of the holding structure 2 can also be adjusted by adjusting extension lengths of the first pipe 11, the first connecting pipes 14, 14a, etc; The height of the holding structure can further be adjusted by adjusting extension lengths of the second pipe 12 and the second connecting pipes 15 and 15a.

Referring to FIGS. 1, 2 and 7, switch of the three states of the support structure 1 can be achieved by applying external forces to extend/retract the pipes or bend the first pipe 11, the first connecting pipe assembly 14 relative to the second pipe 12, the second connecting pipe assembly 15. It is easy to operate, which should be understood by an ordinary person skilled in the art and is not repeated here.

It should be understood that, at each of the three states illustrated in FIGS. 1, 2 and 7, the angles of the holding structure 2 relative to the support structure 1 can be adjusted through the first pivotable connection assembly so that the camera device supported on holding structure 2 of the camera support device 100 can shoot objects at different angles, positions.

In at least one embodiment, through the telescopic pivotable support structure, besides telescopic structures are convenient for storage and carrying and the support height can be adjusted, the camera support device 100 can realize telescoping in addition to being pivotable between the first pipe 11 and the second pipe 12 through the first pivotable connection assembly 13. Thus, it is convenient to adjust the support height and support angle of the holding structure, which is convenient for users to use in a variety of application scenarios, such as bending to adjust the position, height and angle of the lighting member and the electronic devices such as mobile phones on the holding structure, so as to improve the user experience.

In particular, when the camera support device 100 is in use, such as when the user uses the camera support device 100 during live broadcast, the camera (such as front camera or rear camera) of the camera device (such as a mobile phone) on the camera support device 100 can shoot the user's face or target position. At this time, the display surface of the camera device can be substantially parallel to the vertical direction. When it is further necessary to use the camera device on the camera support device 100 to shoot an object on a horizontal support surface, the first pivotable connection assembly 13 can drive the first pivot part to bring the first pipe 11, the first connecting pipe assembly 14, the holding structure 2 and the camera device to rotate (e.g. rotate 90 degrees) relative to the second pivot part through the first pivotable connection assembly 13, so that the camera of the camera device (e.g. rear camera) can correspond to the object on the horizontal support surface, and the display screen of the camera device is located to facilitate the user to view the photographed object displayed on the display screen. At this time, the support height of the second connecting pipe assembly 15 of the pipe assembly 10 can also be adjusted to adjust a distance between the camera device and the object to be photographed, or a telescopic length of the first connecting pipe assembly 14 of the pipe assembly 10 can be adjusted so that the camera of the camera device can exactly correspond to the object to be photographed. Through the telescopic pivotable support structure 1, the camera support device 100 can be used in a variety of scenes, which can improve the user experience.

When the support structure 1 is in the retracted state, the pipes 15, 12, 11 and 14 of the pipe assembly 10 can be retracted in turn, so that most of the plurality of pipes 15, 12, 11, 14 and 14a located above the second connecting pipe 15a are retracted in the lowest pipe 15a. At this time, a support height of the support structure 1 is relatively small, which is convenient for storage, carrying, etc. of the camera support device 100, It can also be applied to photographing or lighting by placing the camera support device 100 on the desktop. In particular, in the retracted state, the first pipe 11, the second pipe 12 and the first pivotable connection assembly 13 can be retracted into the lowest pipe 15a, and the first pipe 11, the second pipe 12 and the first pivotable connection assembly 13 can further achieve effects of being hidden, not easy to be damaged and beautiful.

Figure 9:
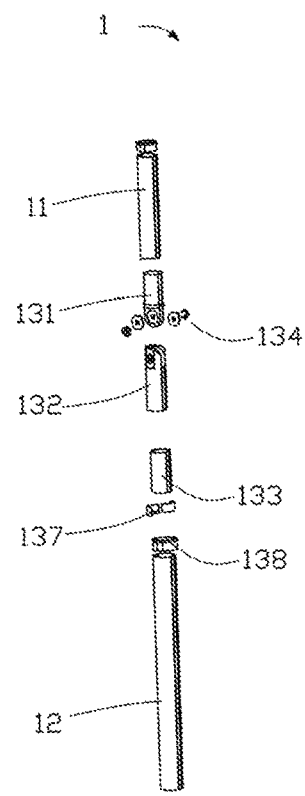
FIG. 9 is an exploded view of part of a support device of a camera support device according to a second embodiment of the present disclosure.
Figure 10:
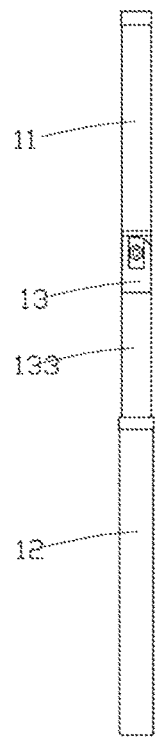
FIG. 10 is a schematic view of the support device of FIG. 9.

Referring to FIGS. 9 and 10. FIG. 9 is a partial exploded view of the telescopic pivotable support structure of the second embodiment. FIG. 10 is a schematic view of the telescopic pivotable support structure of FIG. 9. The telescopic pivotable support structure of the second embodiment is basically same with the telescopic pivotable support structure of the first embodiment. That is, the description of the telescopic pivotable support structure of the first embodiment is basically applicable to the second embodiment. Please referring to FIGS. 3-5, for example, the support structure 1 includes the first pipe 11, the second pipe 12 and the first pivotable connection assembly 13. The first pivotable connection assembly 13 includes a first pivot part 131 and a second pivot part 132. The first pivot part 131 includes a first pivot portion 131a and a first connection portion 131b connected with the first pivot portion 131a. The first connection portion 131b is connected with one end of the first pipe 11. The second pivot part 132 includes a second pivot portion 132a and a second connection portion 132b connected with the second pivot portion 132a. The second connect portion 132b is connected with the second pipe 12, and the second pivot portion 132a is pivotably connected with the first pivot portion 131a, so that the support structure 1 can be telescopic and pivotable. The telescopic pivotable support structure 1 includes a support state, pivot state and retracted state, so that the camera device on the camera support device 100 can be in different heights, angles, etc.

In the retracted state, the first pipe 11, the first pivot portion 131a and the second pivot portion 132a can be basically accommodated in the second pipe 12, so that the volume of the support structure 1 can be minimized to the volume of the second pipe 12. In the retracted state, the camera support device 100 can be placed on a desktop to support a camera device, which is especially for live broadcast.

In the support state, the first pipe 11 and the second pipe 12 extend in a same direction, and at least part of the first pipe extend out of the second pipe 12. Specifically, in at least one embodiment, in the support state, one part of the first pipe 11 extends out of the second pipe 12, the other part of the first pipe 11, the first pivot portion 131a and the second pivot portion 132a are accommodated in the second pipe 12. In at least one embodiment, in the support state, the first pipe and the first pivot portion 131a can extend out of the second pipe 12, while the second pivot portion 132a can be accommodated in the second pipe 12. In at least one embodiment, the first pipe 11, the first pivot portion 131a and the second pivot portion 132a can extend out of the second pipe 12.

In the first embodiment, the first connection portion 131b is accommodated in one end of the first pipe 11 so as to be connected with the first pipe 11. The second connection portion 132b can be accommodated in the second pipe 12 so as to be connected with the second pipe 12. In the support state, the camera support device 100 can be supported on the ground to support a camera device, which allows a user to freely adjust a height of the support structure 1 according to an object to be photographed.

Since the first embodiment has described the support structure 1 in detail, the following mainly introduces the differences between the support structure 1 of the second embodiment shown in FIGS. 9-10 and the support structure 1 of the first embodiment. In the second embodiment, the first pivotable connection assembly 13 can further include an auxiliary pipe 133 connected to the second connection portion 132b. The auxiliary pipe 133 is connected with the second pipe 12 so that the second connection portion 132b is connected with the second pipe 12. In the retracted state, the auxiliary pipe 133 is also accommodated in the second pipe 12. The auxiliary sleeve 133 can strengthen support and connection between the second connection portion 132b and the second pipe 12, so that the support structure of the second embodiment has better support strength and reliability, and the service life can also be improved.

Figure 11:
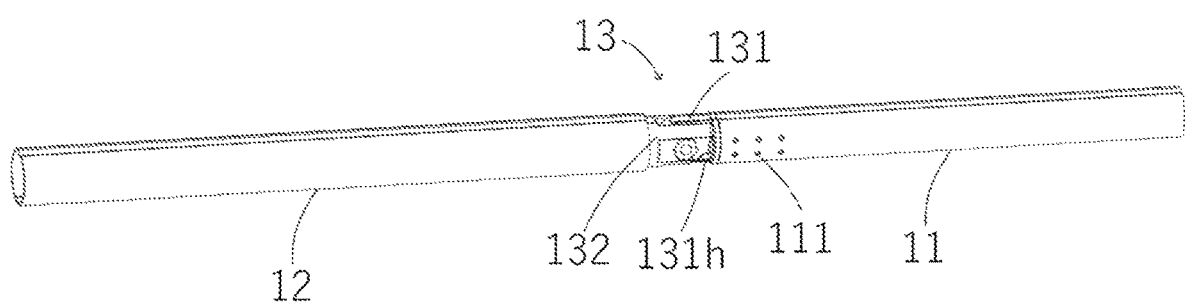
FIG. 11 is a partial schematic view of a telescopic pivotable support structure of the camera support device according to a third embodiment of the present disclosure.
Figure 12:
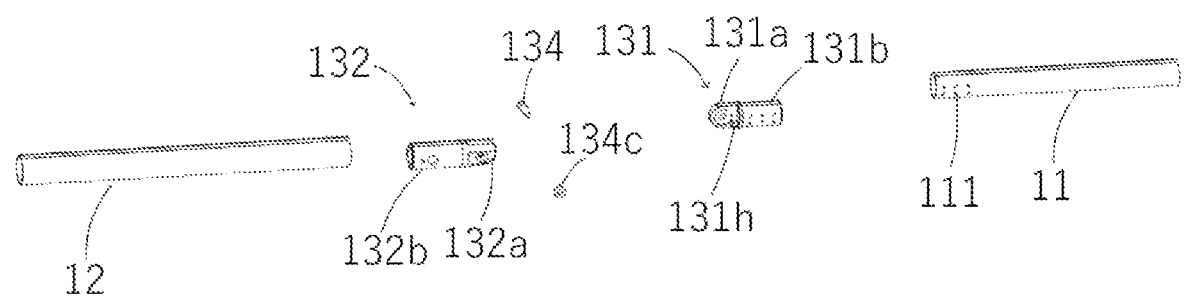
FIG. 12 is partial exploded view of the telescopic pivotable support structure 1 of FIG. 11.
Figure 13:
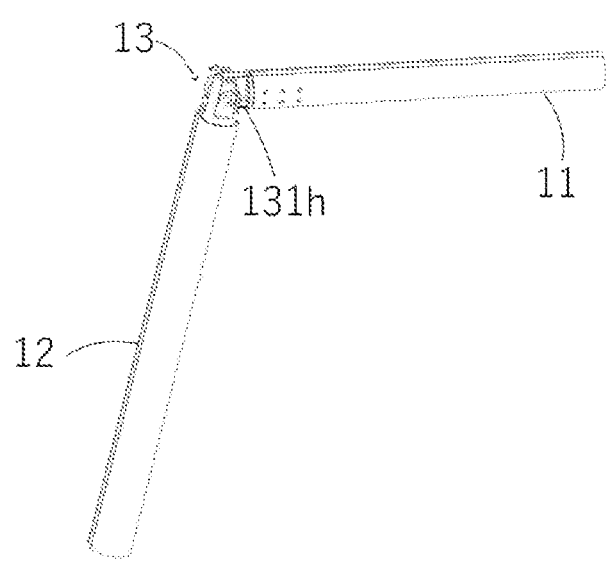
FIG. 13 is a schematic view of the telescopic pivotable support structure of FIG. 11 with part structures thereof is in a pivot state.
Figure 14:
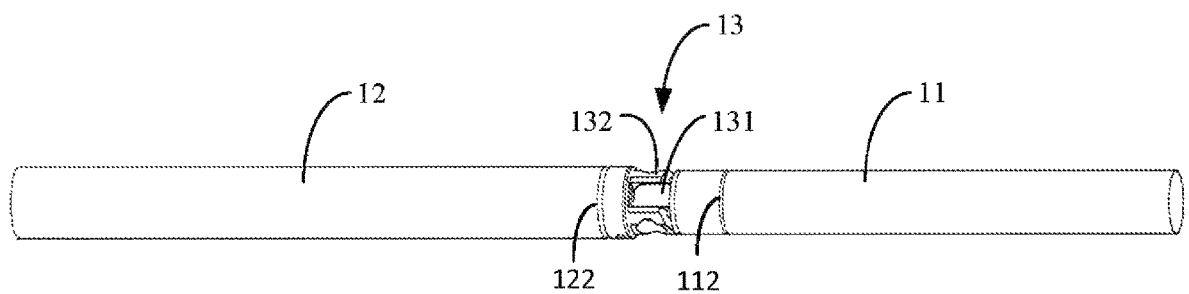
FIG. 14 is a schematic view of a telescopic pivotable support structure according to a fourth embodiment of the present disclosure.
Figure 15:
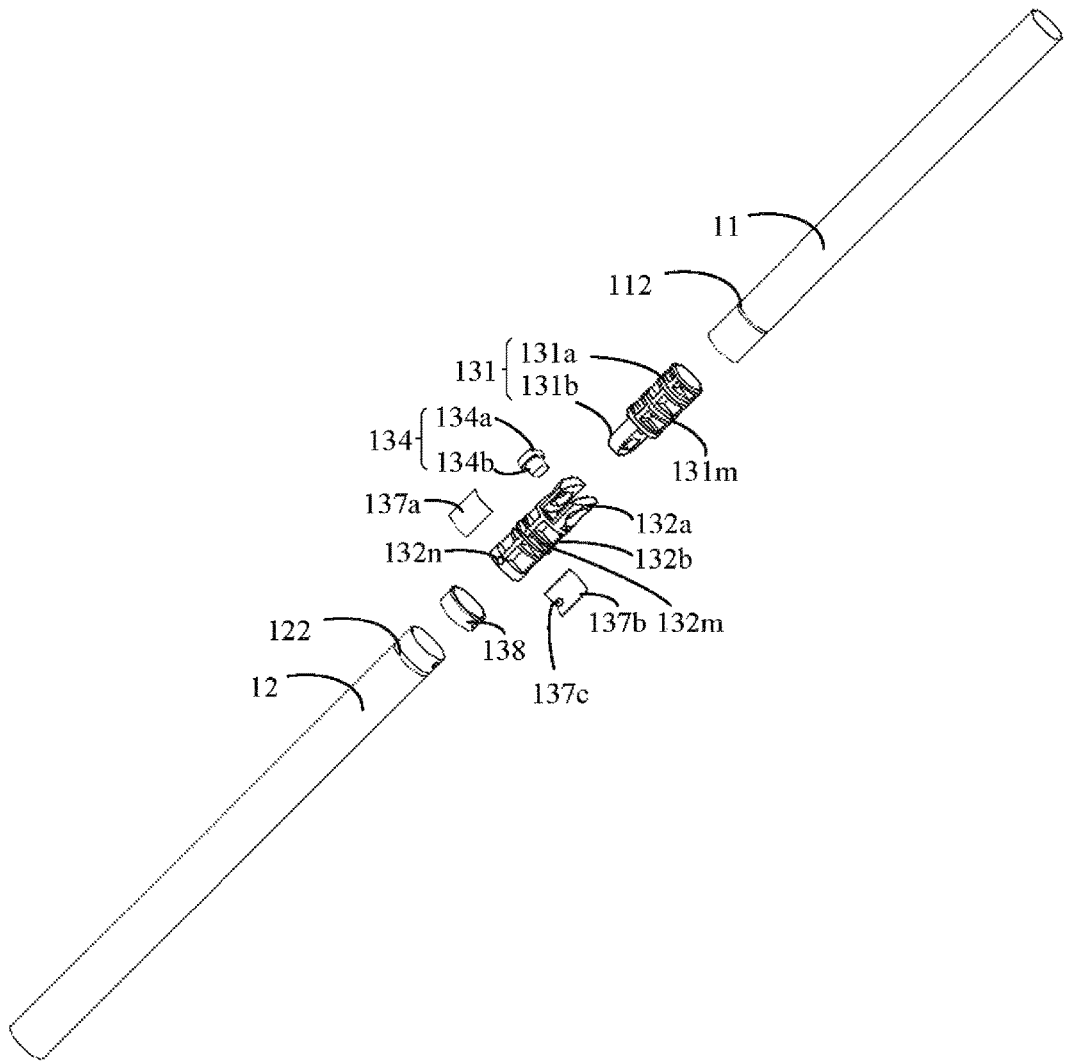
FIG. 15 is an exploded view of the telescopic pivotable support structure of FIG. 14.
Figure 16:
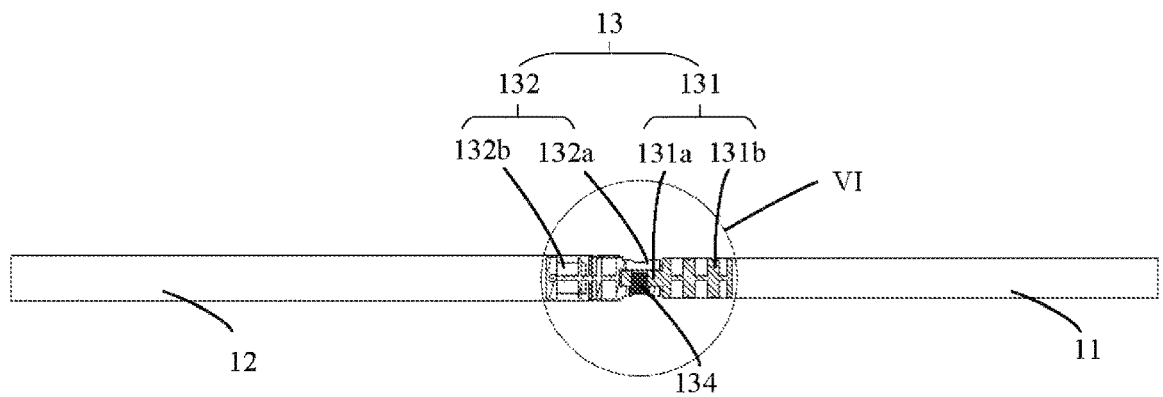
FIG. 16 is a cross-sectional view of the telescopic pivotable support structure of FIG. 14.
Figure 17:
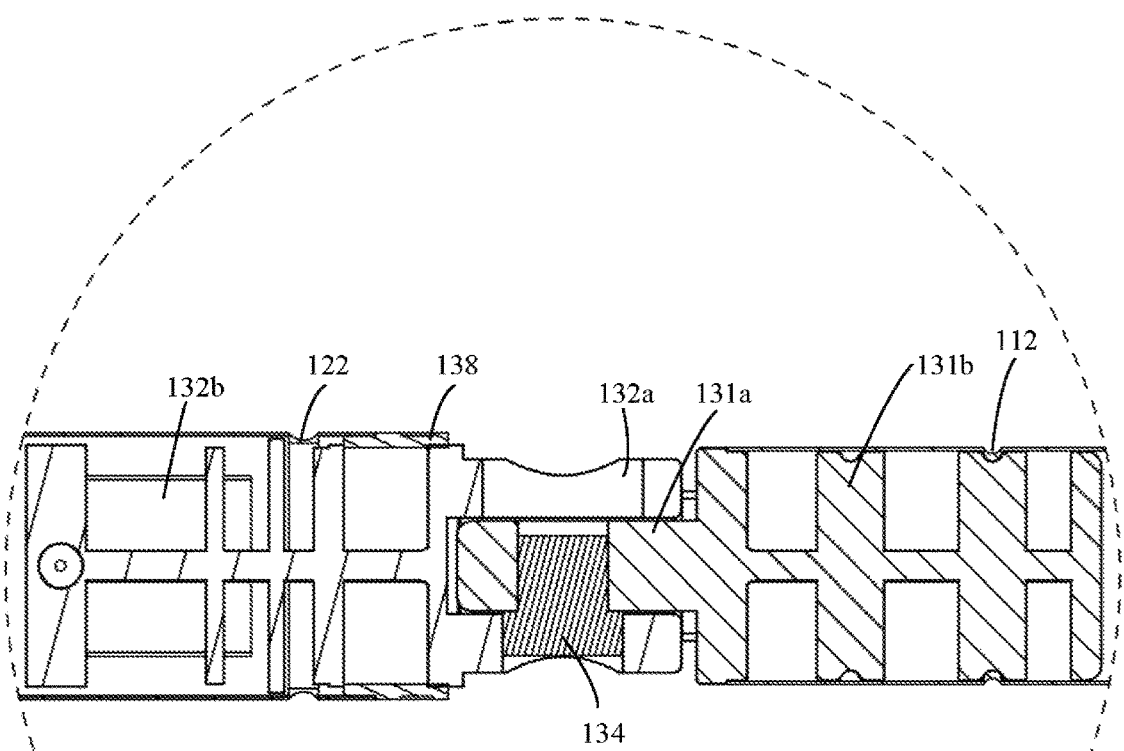
FIG. 17 is an enlarged view of the portion VI shown in FIG. 16.
Figure 18:
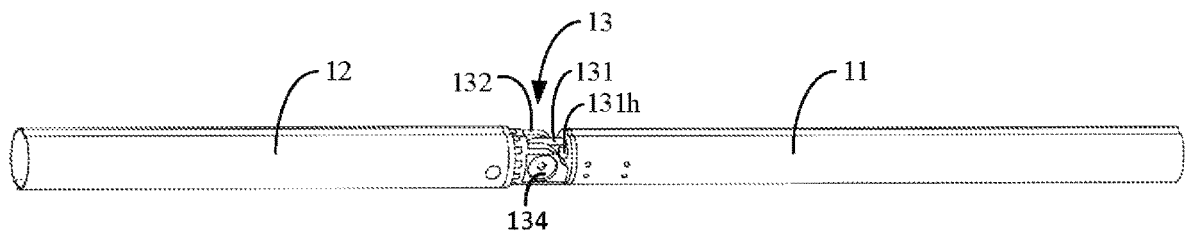
FIG. 18 is a schematic view of a telescopic pivotable support structure according to a fifth embodiment of the present disclosure.
Figure 19:
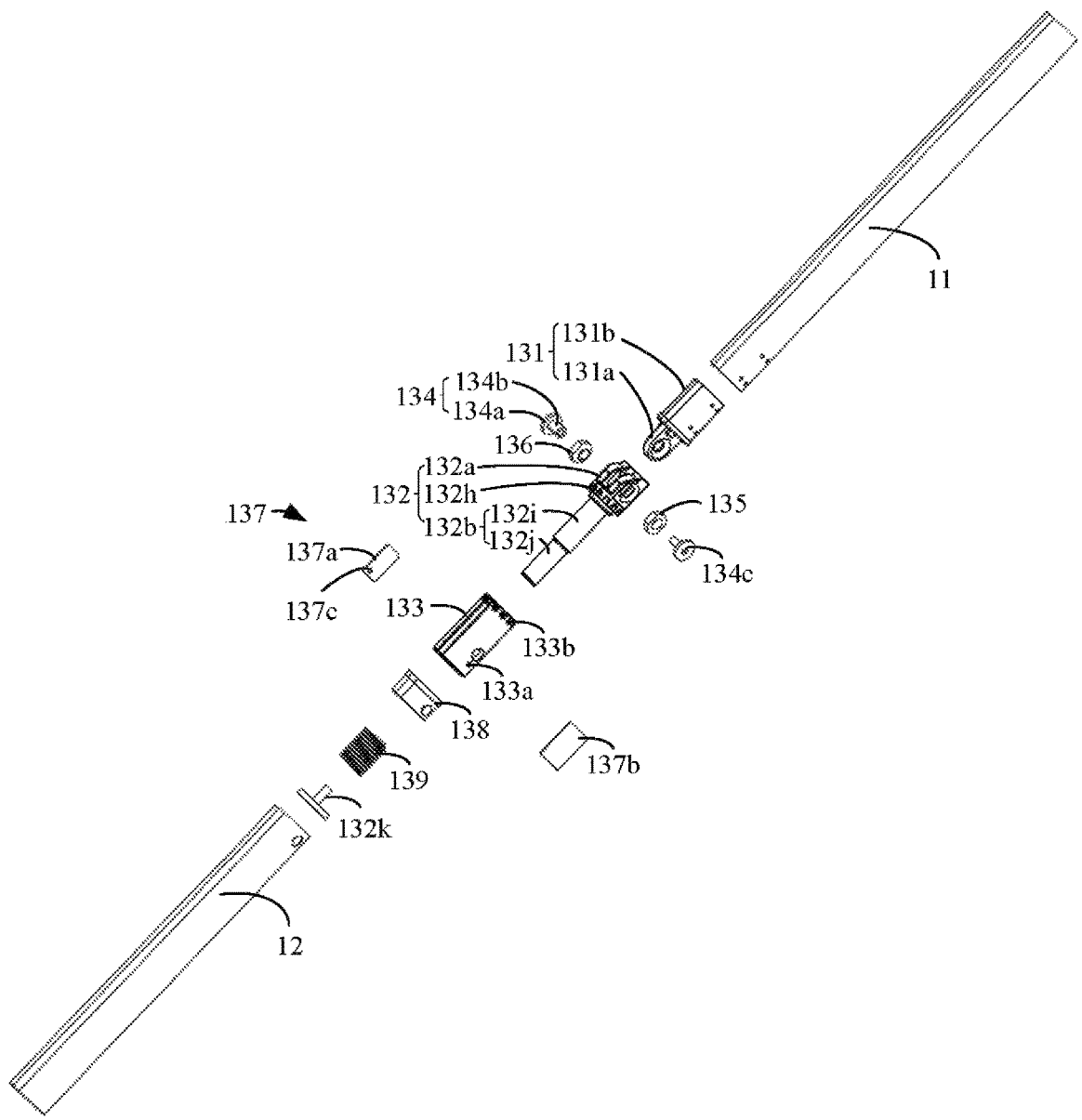
FIG. 19 is an exploded view of the telescopic pivotable support structure of FIG. 18.
Figure 20:
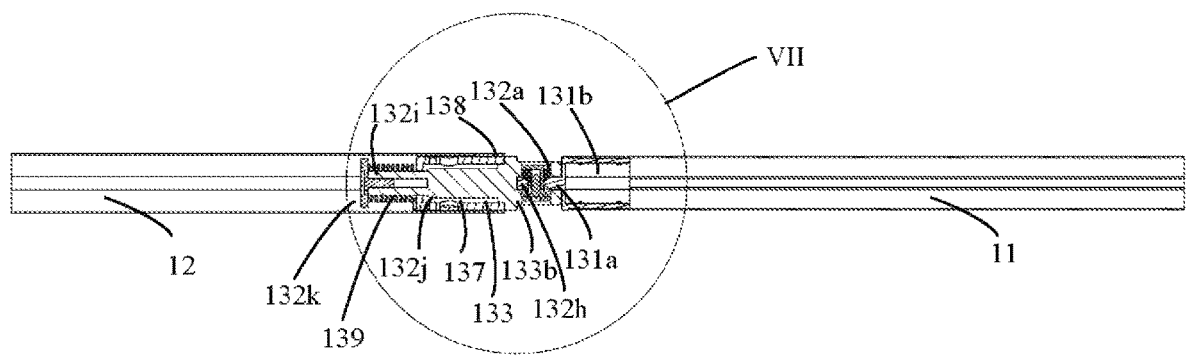
FIG. 20 is a cross-sectional view of the telescopic pivotable support structure of FIG. 18.
Figure 21:
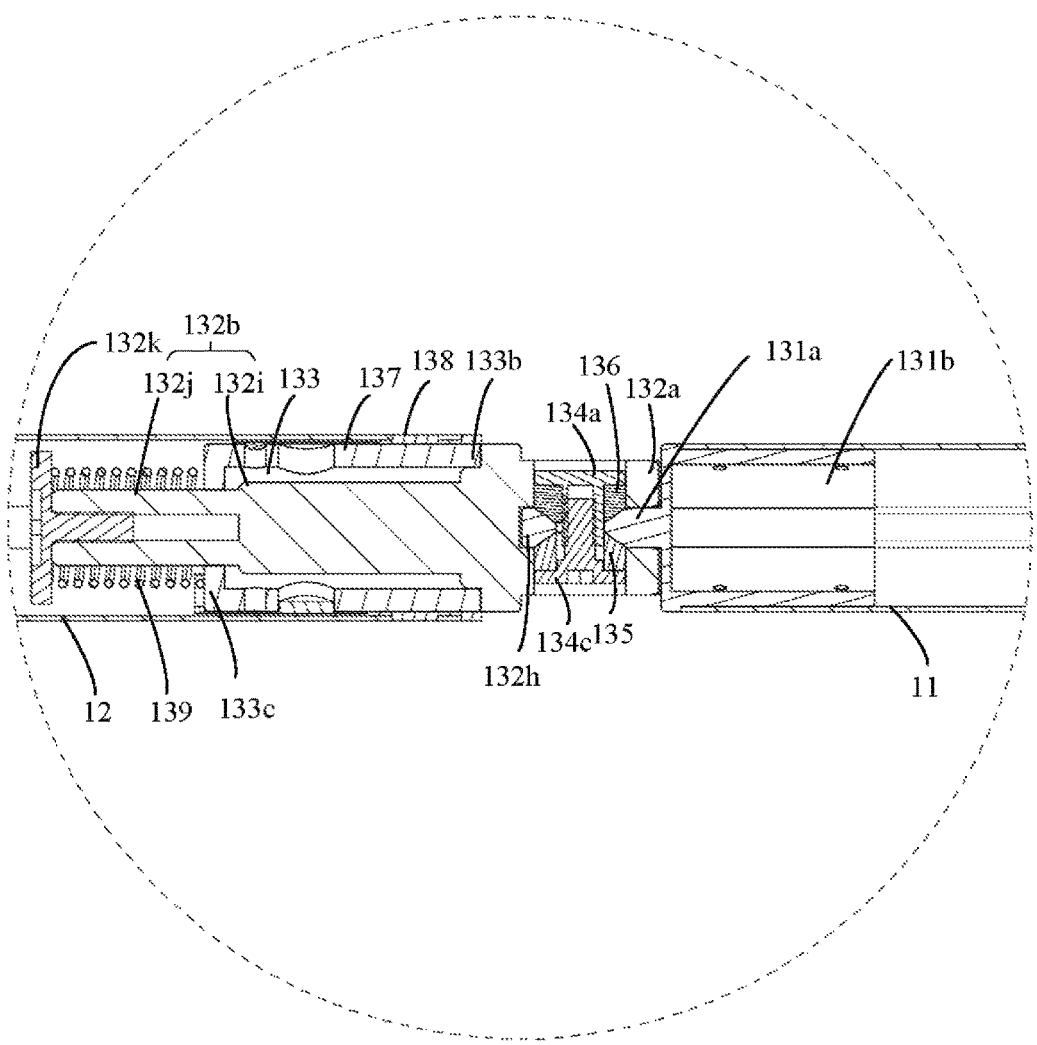
FIG. 21 is an enlarged view of the portion VII shown in FIG. 20.

Referring to FIGS. 11-13, the present disclosure further includes a third embodiment. FIG. 11 is a partial schematic view of the support structure 1 of the camera support device 100 according to the modified embodiment of the present disclosure; FIG. 12 is a partial exploded view of the support structure 1 of FIG. 11; FIG. 13 is a schematic view of the support structure of FIG. 11 with part structure thereof is in a pivot state. The telescopic pivotable support structure 1 of the modified embodiment is basically same with the telescopic pivotable support structure of the first embodiment. That is, the description of the telescopic pivotable support structure of the first embodiment is basically applicable to the modified embodiment. The following will combine with FIGS. 11-13 to illustrate differences between the telescopic pivotable support structure of the modified embodiment and the telescopic pivotable support structure of the first embodiment.

Referring to FIGS. 11-13, one of the first pivot portion 131a and the second pivot portion 132a further includes a stop portion 131h. In the pivot state, the stop portion 131h resists against the other of the first pivot portion 131a and the second pivot portion 132a. In the embodiment, the stop portion 131h is arranged on the first pivot portion 131a, in the pivot state, the stop portion 131h resists against the second pivot portion 132a. Specifically, the number of the stop portion 131h is two. In the pivot state, one of the stop portions 131h resists against the first base 132d, the other of the stop portions 131h resists against the second base 132e. The stop portion 131h can provide better support for the second pivot portion 132a in the pivot state so as to improve stability in the pivot state. The number of the stop portions is two, which can support the second pivot portion 132a in a balanced way, so as to further improve stability in the pivot state. The stop portion 131h can be integrally formed with one of the first pivot portion 131a and the second pivot portion 132a, and is made of same material. The stop portion 131h can be a protruding structure.

The first pipe 11 can be connected together with the first connection portion 131b through a stamping process. The outer surface of the first pipe 11 is provided with a stamping groove or a stamping hole 111. Through the stamping process, the size and shape accuracy of parts can be ensured, the quality of products can be ensured, and the material loss can be reduced, which can effectively reduce production cost. At the same time, the stamping process has simple operation and can better improve production efficiency.

In at least one embodiment, the first connection portion 131b can rotate at one end of the first pipe 11 to drive the first pivotable connection assembly 13 and the second pipe 12 to rotate relative to the first pipe; and/or the second connection portion can rotate at one end of the second pipe 12, so as to drive the first pivotable connection assembly 13 and the first pipe 11 to rotate relative to the second pipe 12.

Referring to FIGS. 14-17, the present disclosure further includes a fourth embodiment. The telescopic pivotable support structure 1 of the fourth embodiment is basically same with the telescopic pivotable_support structure of the first embodiment. That is, the description of the telescopic pivotable support structure of the first embodiment is basically applicable to the modified embodiment. For example, the first pivotable connection assembly 13 includes a first pivot part 131, a second pivot part 132, an auxiliary pipe 133, a first pivot shaft 134, a first pad 135 and a second pad 136. The first pivot part 131 includes a first pivot portion 131a and a first connection portion 131b. The second pivot part 132 includes a second pivot portion 132a and a second connection 132b. The first pivot shaft 134 includes a first cap 134a, a first shaft 134b and a first fastener 134c. The following will combine with FIGS. 11-13 to illustrate differences between the telescopic pivotable support structure of the modified embodiment and the telescopic pivotable support structure of the first embodiment. The first connection portion 131b is connected with the first pipe 11, the second connection portion 132b is connected with second pipe 12, the first shaft 134b passes through a through hole of the second pad 136, pivot holes of the second pivot portion 132a and the first pivot portion 131a, and a through hole of the first pad 135 so as to pivotably connect the first pipe 11 and the second pipe 12 together.

The following will combine with FIGS. 14-17 to illustrate differences between the telescopic pivotable support structure of the modified embodiment and the telescopic pivotable support structure of the first embodiment.

The first pivotable connection assembly 13 further comprises an auxiliary pipe 133, a at least one positioning member 137, and a stop sleeve 138, and an elastic member 139. The second connection portion 132b includes a first rod 132i connected with the second pivot portion 132a and a second rod 132j connected with the first rod 132i. A diameter of the second rod 132j is less than that of the first rod 132i so as to form a step structure. The auxiliary pipe 133 includes a bottom wall 133c defining a bottom hole (not labeled). An inner diameter of the bottom hole is greater than an outer diameter of the second rod 132j and is less than an outer diameter of the first rod 132i. Therefore, the second rod 132j can pass through the bottom hole while an end of the first rod connected with the second rod 132j resists against the bottom wall 133c of the auxiliary pipe 133. The The elastic member 139 can be sleeved on the second rod 132j and resists against the bottom wall 133c of the auxiliary pipe 133. The second pivot part 132 further includes a fixing member 132k, which can be engaged with the second rod 132j so as to clamp the elastic member 139 between the first rod 132i and the bottom wall 133c so as to connect the auxiliary pipe 133 and the second pivot part 132 together. The at least one positioning member 137 is arc-shaped and includes a first positioning member 137a and a second positioning member 137b. The first positioning member 137a and the second positioning member 137b are connected two opposite sides of the auxiliary pipe 133. Each of the first positioning member 137a and the second positioning member 137b is provided with a bump 137c, and the auxiliary pipe 133 defines a receiving hole 133a configured to receive the bump 137c so as to connect the at least one positioning member 137 with the auxiliary pipe 133. The stop sleeve 138 is arranged between an outer wall of the auxiliary pipe 133 and an inner wall of the second pipe 12 and configured to prevent the auxiliary pipe 133 from moving away from the second pipe 12.

The second pivot part 132 further includes a first gear portion 132h, and the auxiliary pipe 133 further includes a second gear portion 133b. The second gear portion 133b can be meshed with the first gear portion 132h. When an external force is applied on the second pivot part 132 to rotate the second pivot part 132 relative to the auxiliary pipe 133, the auxiliary pipe 133 moves towards the second pipe to compress the elastic member 139, so that the second gear portion 133b is detached from the first gear portion 132h. When the second pivot part 132 moves to a desired angle and the external force is released, the elastic member 139 restores to force the auxiliary pipe 133 to move towards the second pivot part 132 until the second gear portion 133b meshes with the first gear portion 132h. In this way, the first pipe 11 can rotate around an extension direction thereof relative to the second pipe 12.

Referring to FIGS. 18-21, the present disclosure further includes a fifth embodiment. The telescopic pivotable support structure 1 of the fifth embodiment is basically same with the telescopic pivotable support structure of the first embodiment. That is, the description of the telescopic pivotable support structure of the first embodiment is basically applicable to the modified embodiment. For example, the first pivotable connection assembly 13 includes a first pivot part 131, a second pivot part 132, an auxiliary pipe 133, and a first pivot shaft 134. The first pivot part 131 includes a first pivot portion 131a and a first connection portion 131b. The second pivot part 132 includes a second pivot portion 132a and a second connection 132b. The first pivot shaft 134 includes a first cap 134a and a first shaft 134b. The first connection portion 131b is connected with the first pipe 11, the second connection portion 132b is connected with second pipe 12, the first shaft 134b passes through pivot holes of the second pivot portion 132a and the first pivot portion 131a so as to pivotably connect the first pipe 11 and the second pipe 12 together. The first pivotable connection assembly 3 further includes at least one positioning member 137 and a stop sleeve 138. The at least one positioning member 137 is arc-shaped and includes a first positioning member 137a and a second positioning member 137b. The first positioning member 137a and the second positioning member 137b are connected two opposite sides of the second connection portion 132. Each of the first positioning member 137a and the second positioning member 137b is provided with a bump 137c, and the second connection portion 132 defines a receiving hole 132m configured to receive the bump 137c so as to connect the at least one positioning member 137 with the second connection portion 132. The stop sleeve 138 is arranged between an outer wall of the auxiliary pipe 133 and an inner wall of the second pipe 12 and configured to prevent the second connection portion 132 from moving away from the second pipe 12.

The following will combine with FIGS. 18-21 to illustrate differences between the telescopic pivotable support structure of the modified embodiment and the telescopic pivotable support structure of the first embodiment.

The first pipe 11 defines a first circular recessed portion 112, and the first connection portion 131b defines at least one first circular positioning groove 131m configured to receive the circular recessed portion 112 so as to limit an axial position of the first connection portion 131b relative to the first pipe 11. It should be understood that, the number of the at least one first circular positioning groove 131m is two or more, each of the at least one first circular positioning groove 131m limits an axial position of the first connection portion 131b relative to the first pipe 11 so as to change the support length of the telescopic pivotable support structure 1. Furthermore, the cooperation of the first circular recessed portion 112 and the first circular positioning groove 131m allows rotation of the first pipe 11 around an extension direction of the first pipe relative to the first connection portion 131. Therefore, rotation of the first pipe 11 around the extension direction of the first pipe relative to the second pipe is achieved.

Similarly, the second pipe 12 defines a second circular recessed portion 122, and the second connection portion 132b defines at least one second circular positioning groove 132m configured to receive the second circular recessed portion 122 so as to limit an axial position of the second connection portion 132b relative to the second pipe 12. It should be understood that, the number of the at least one second circular positioning groove 132m is two or more, each of the at least one second circular positioning groove 132m limits an axial position of the second connection portion 132b relative to the second pipe 12 so as to change the support length of the telescopic pivotable support structure 1. Furthermore, the cooperation of the second circular recessed portion 122 and the second circular positioning groove 132m allows rotation of the second pipe 12 around an extension direction of the second pipe 12 relative to the second connection portion 131. Therefore, rotation of the first pipe 11 around the extension direction of the first pipe relative to the second pipe is achieved.

Figure 22:
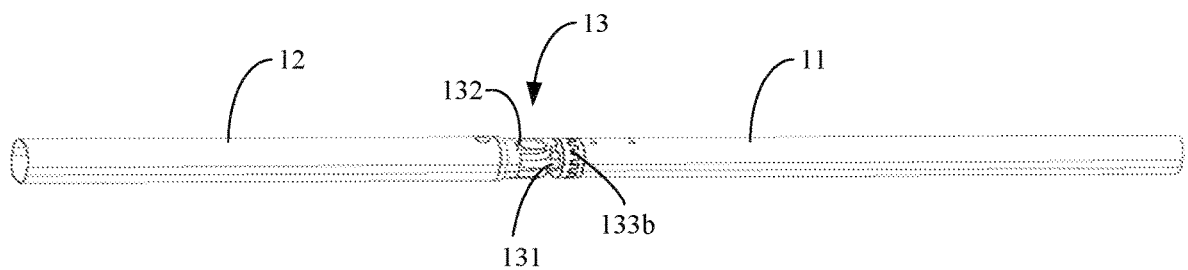
FIG. 22 is a schematic view of a fan with a telescopic pivotable support structure in a retracted state according to an embodiment of the present disclosure.
Figure 23:
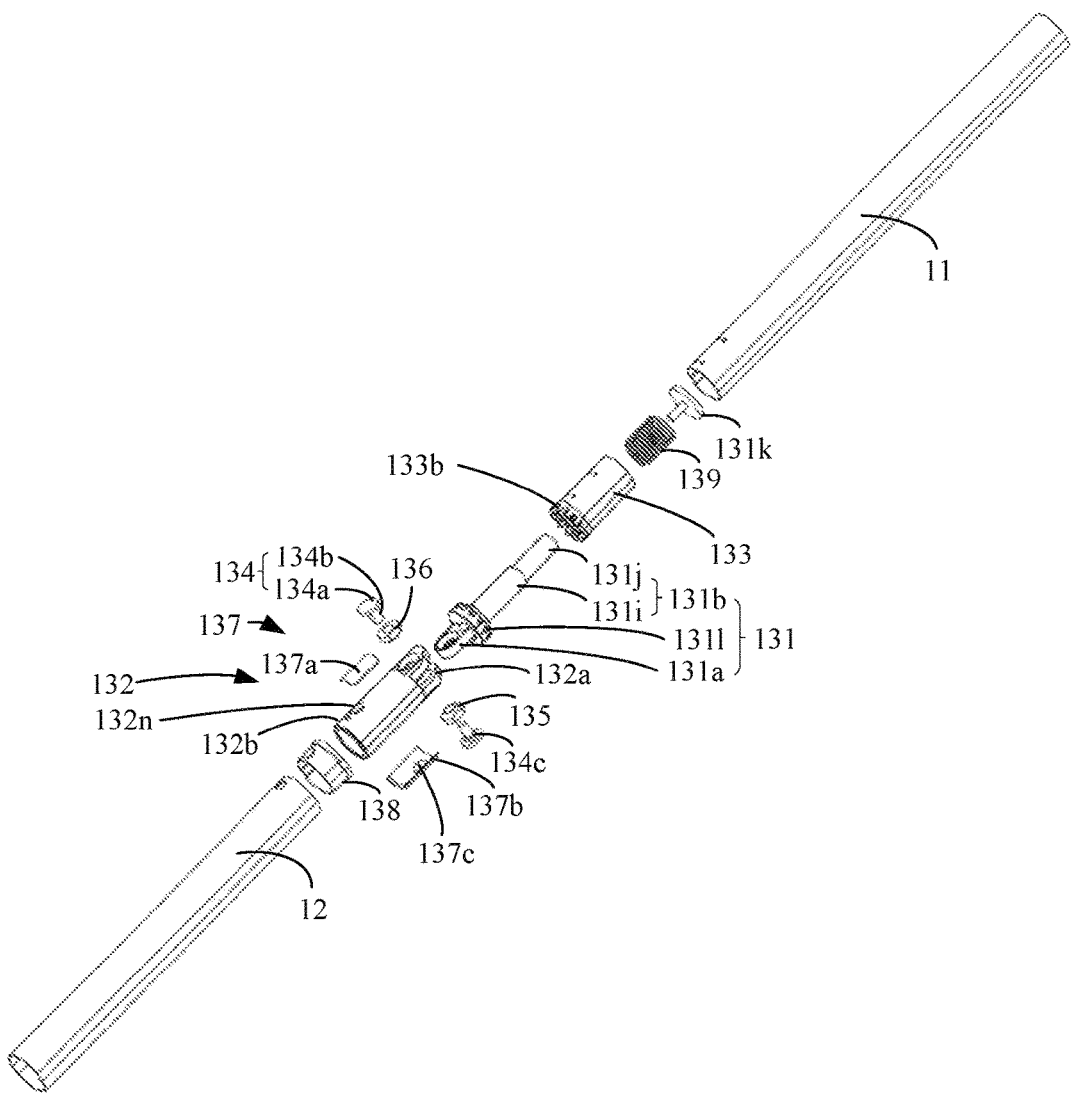
FIG. 23 is a schematic view of the fan of FIG. 22 in a support state.
Figure 24:
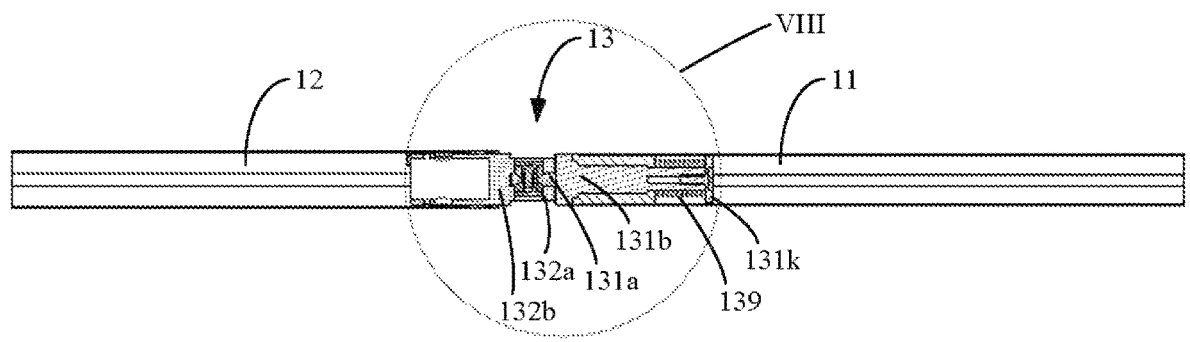
FIG. 24 is a schematic view of the fan of FIG. 22 in a pivot state.

Referring to FIGS. 22-24, FIG. 22 is a schematic view of a fan 200 with the telescopic pivotable support structure 1 in a retracted state; FIG. 23 is a schematic view of the fan 200 of FIG. 22 in a support state; and FIG. 24 is a schematic view of the fan 200 in a pivot state. The fan 200 includes a fan body 6 and the support structure 1. The support structure 1 support the fan body 6.

In the embodiment, the support structure 1 can be the telescopic pivotable support structure 1 illustrated in any one of above-mentioned embodiments. The telescopic pivotable support structure 1 has been illustrated in detail in the above embodiments, here is merely a brief description.

In the embodiment, the support structure 1 includes a first pipe 11, a second pipe 12 and a first pivotable connection assembly 13. The first pivotable connection assembly 13 includes a first pivot part 131 and a second pivot part 132. The first pivot part 131 includes a first pivot portion 131a and a first connection portion 131b connected with the first pivot portion 131a. The first connection portion 131 is connected with one end of the first pipe 11. The second pivot part 132 includes a second pivot portion 132a and a second connection portion 132b connected with the second pivot portion 132a. The second connection portion 132b is connected with the second pipe 12. The first pivot portion 131a is pivotably connected with the second pivot portion 132a so as to make the support structure 1 telescopic and pivotable. The telescopic pivotable support structure 1 includes a support state, a pivot state and a retracted state, so that the fan body 6 of the fan 200 can be supported at different heights, angles or positions, which is convenient used in different applicable scenarios and can improve user experience.

Referring to FIGS. 3-5, in the retracted state, the first pipe 11, the first pivot portion 131a and the second pivot portion 132a are accommodated in the second pipe 12 so that make a volume of the whole support structure 1 retracted to a volume of the second pipe 12. In the retracted state, the fan 200 can be located on a table for use. In the support state, the first pipe 11 and the second pipe 12 extends in a same direction, at least part of the first pipe 11 extends out of the second pipe 12. Specifically, in at least one embodiment, in the support state, one part of the first pipe 11 extends out of the second pipe 12, the other part of the first pipe 11, the first pivot portion 131a and the second pivot portion 132a are accommodated in the second pipe 12. In at least one embodiment, in the support state, the first pipe 11 and the first pivot portion 131a can extend out of the second pipe 12; or, the first pipe 11, all the first pivot portion 131a and the second pivot portion 132a extend out of the second pipe 12. Furthermore, the first connection portion 131b is accommodated in one end of the first pipe 11; the second connection portion 132b is accommodated in the second pipe 12. In the support state, the fan 200 can be used as a floor fan, and a user can freely adjust a height of the fan 200 by adjusting a length of the support structure 1. In the pivot state, among the first pipe 11, the first pivot portion 131a and the second pivot portion 132a, at least the first pipe 11 extends out of the second pipe 12, and the first pivot portion 131a is pivot relative to the second pivot portion 132a at a preset angle, which makes the first pivot portion 131a and the second pivot portion 132a connected in a pivot state through the first pivotable connection assembly 13. In the embodiment, in the pivot state, all the first pipe 11, the first pivot portion 131a and the second pivot portion 132a may extend out of the second pipe 12. In the pivot state, an air outlet angle of the fan 200 can be changed by adjusting the pivot angle, which is more convenient to use and improves the user experience.

In the embodiment, the telescopic pivotable support structure 1 makes the fan 200 easy to store, carry and convenient for use on a desktop or the ground, which can be applicable in a variety of scenarios and improve the user experience.

Figure 25:
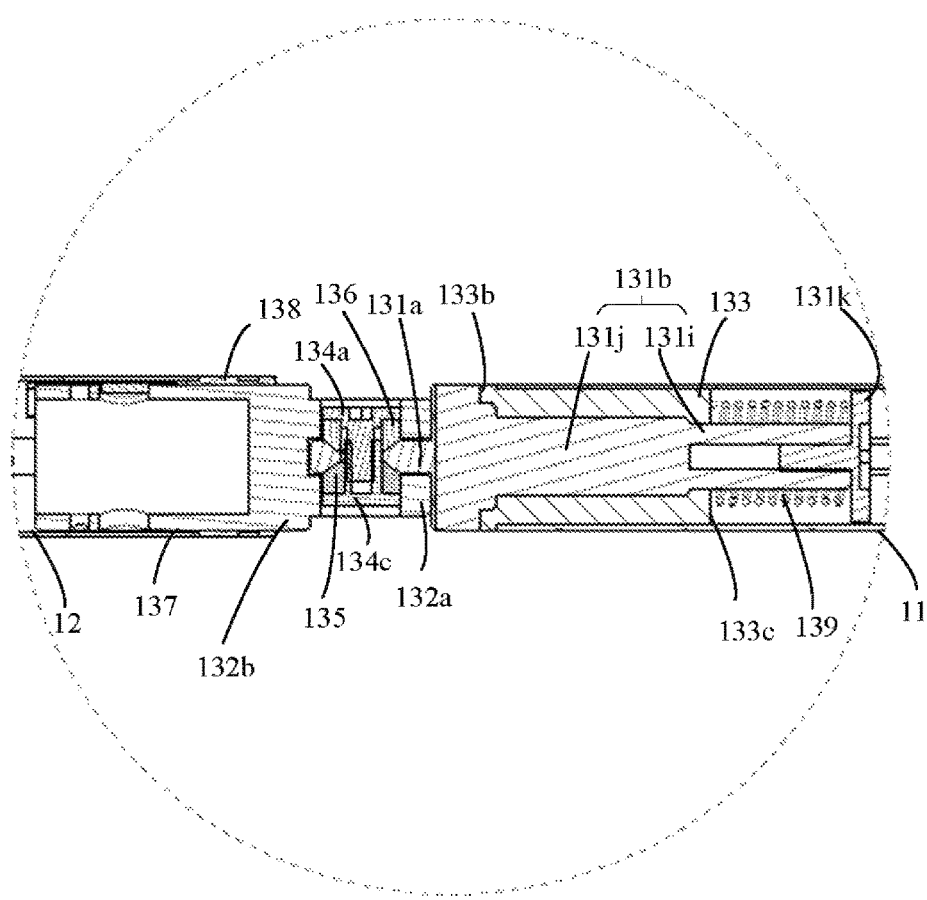
FIG. 25 is a schematic view of a lamp with a telescopic pivotable support structure in a retracted state according to an embodiment of the present disclosure.
Figure 26:
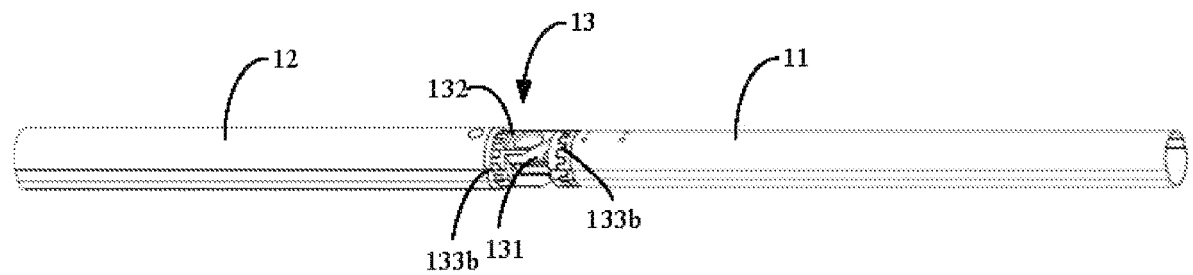
FIG. 26 is a schematic view of the lamp of FIG. 25 in a support state.
Figure 27:
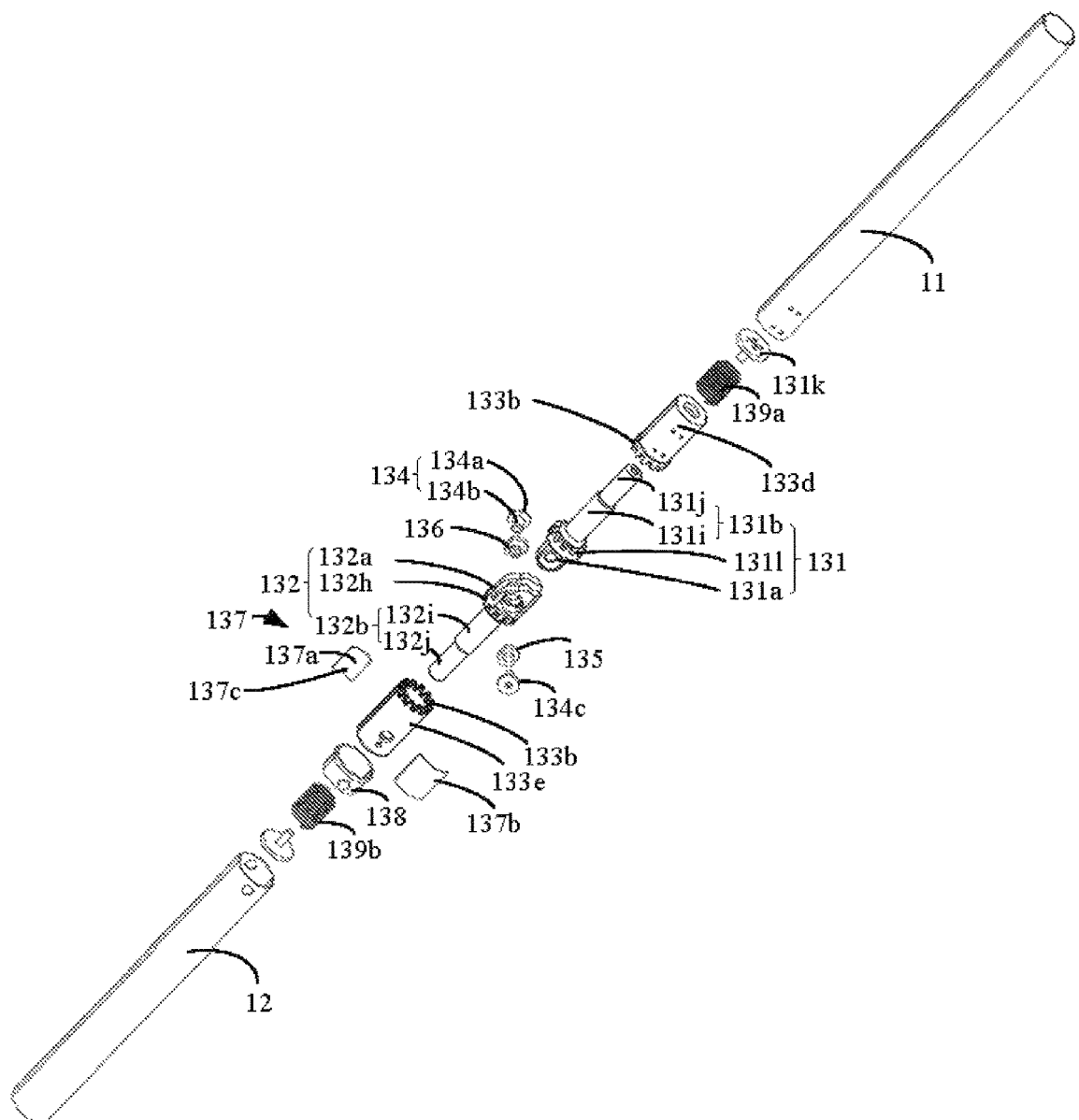
FIG. 27 is a schematic view of the lamp of FIG. 26 in a pivot state.
Figure 28:
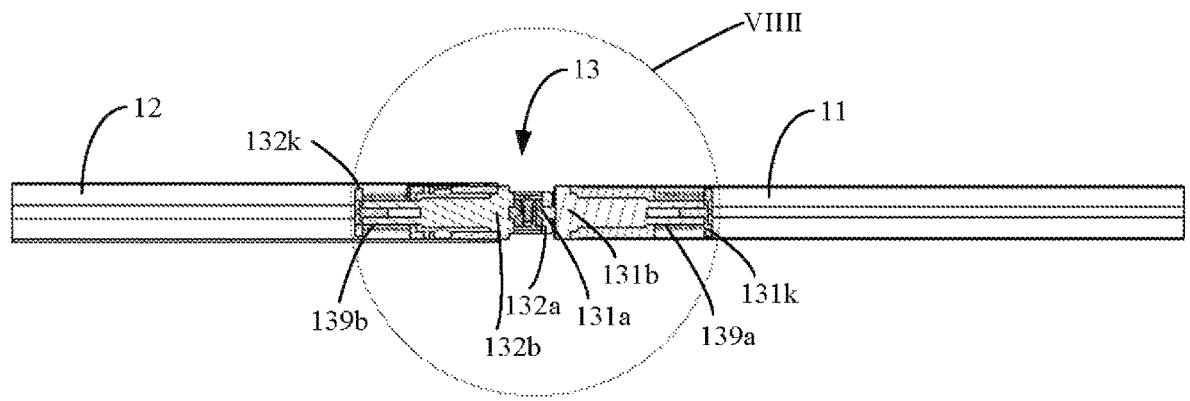
Figure 29:
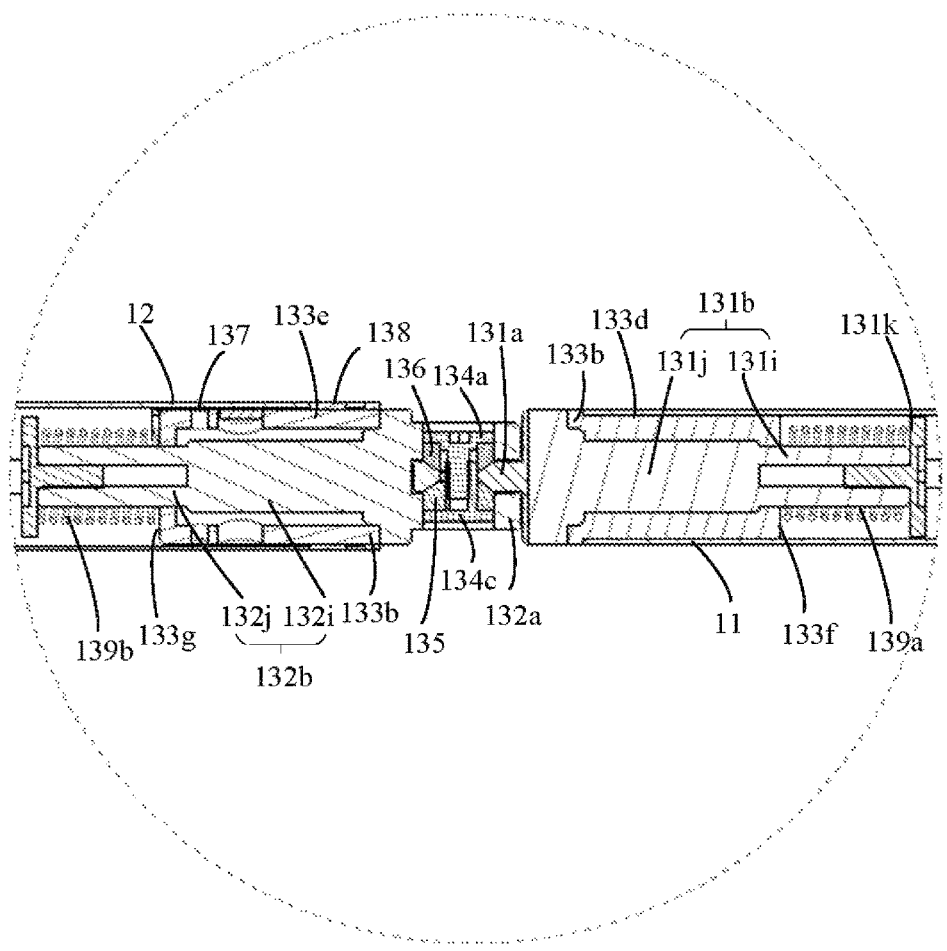
Figure 30:
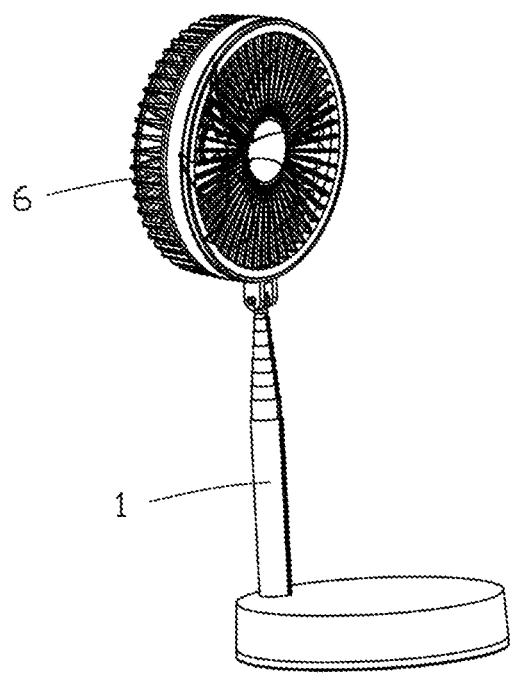
Figure 31:
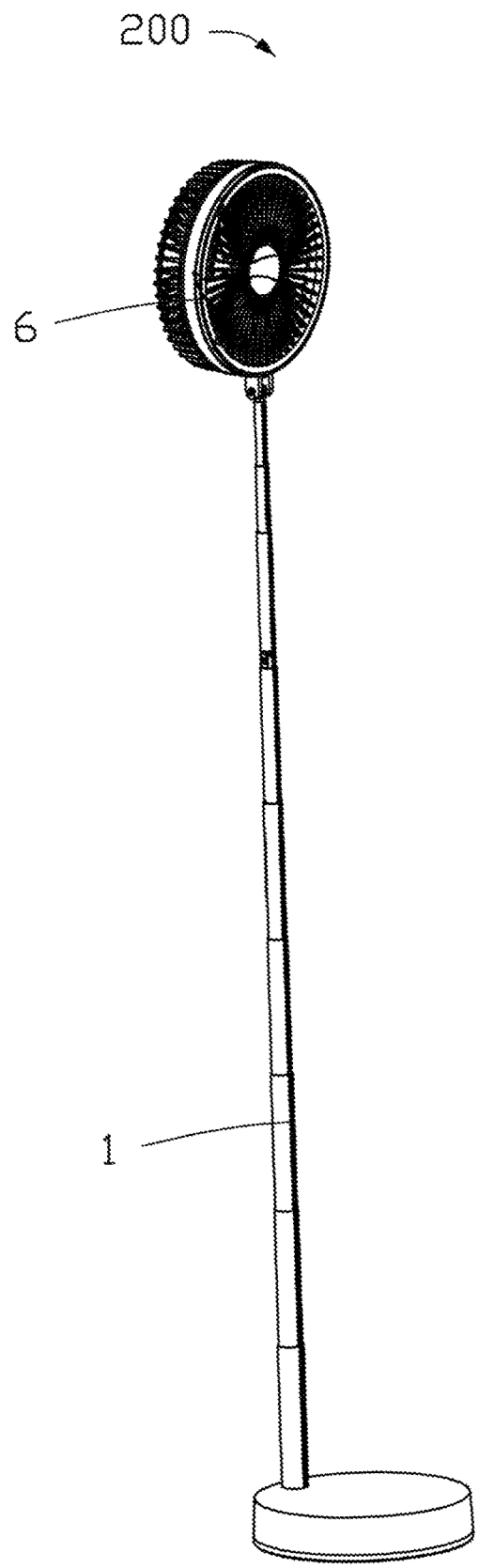
Figure 32:
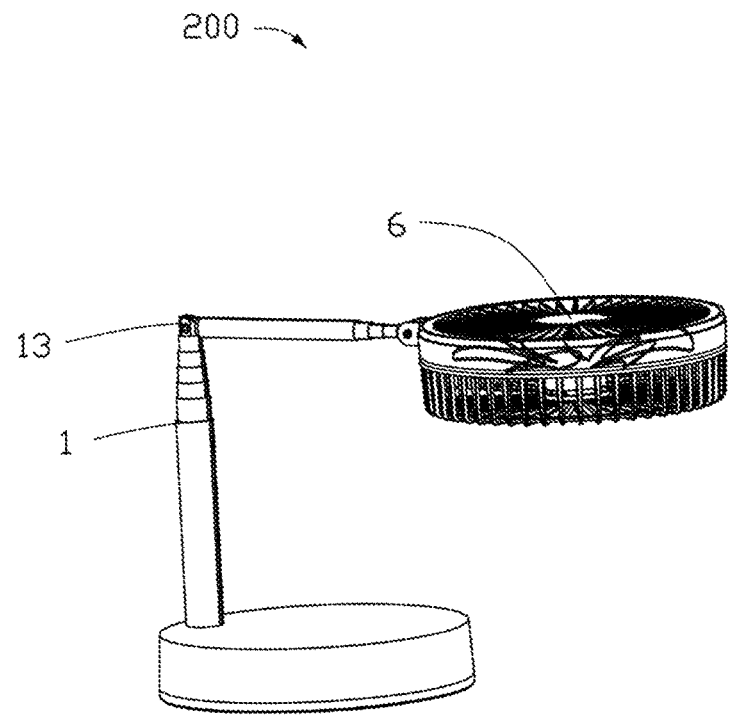
Figure 33:
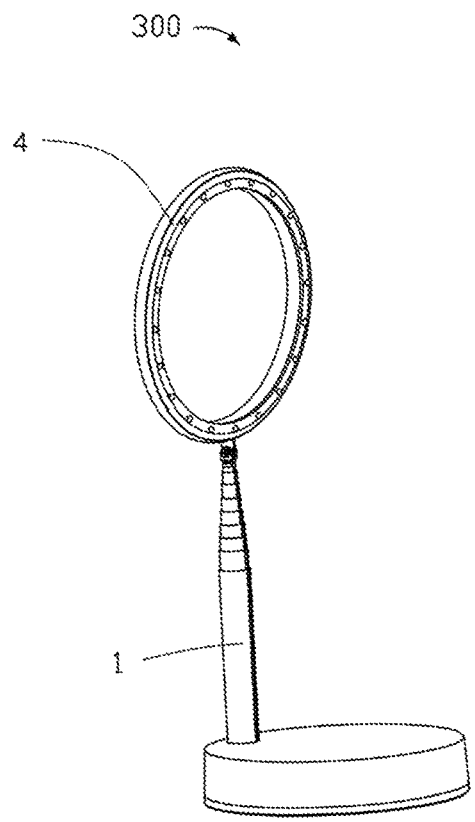
Figure 34:
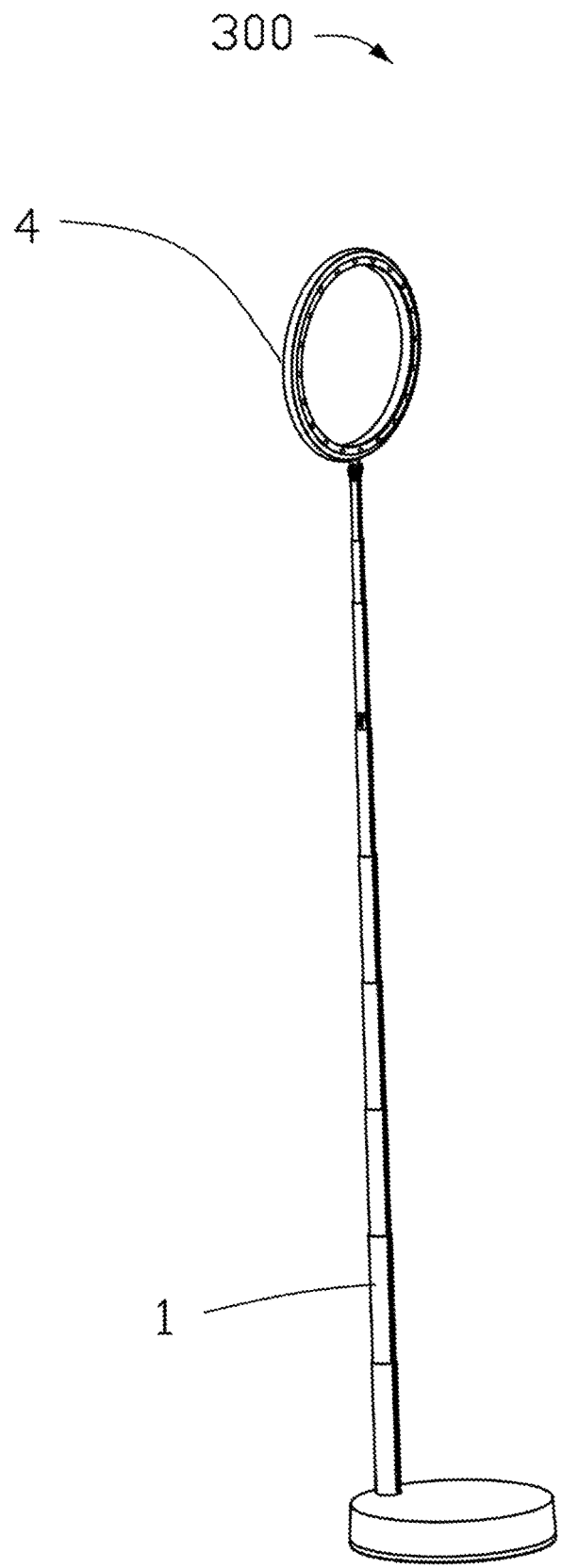
Figure 35:
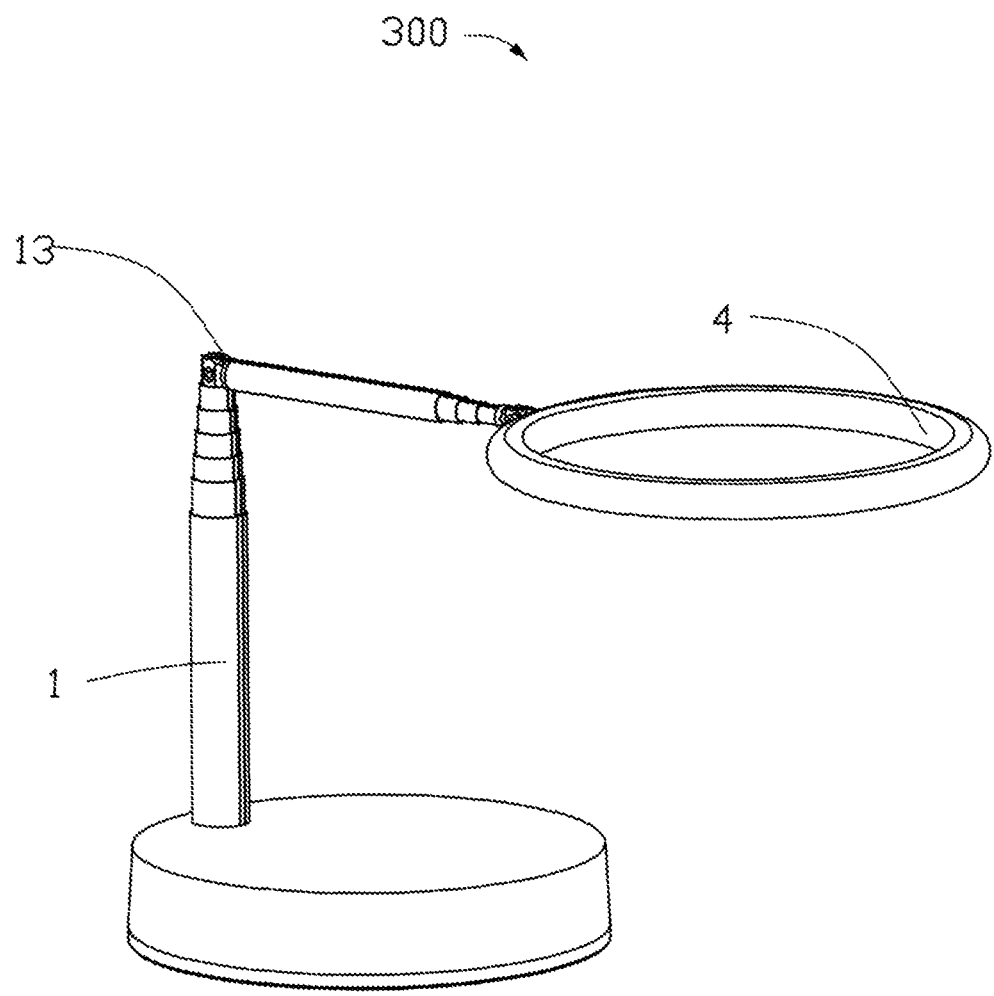

Referring to FIGS. 25, 26 and 27, FIG. 25 is a schematic view of a lamp 300 with the telescopic pivotable support structure 1 in a retracted state; FIG. 26 is a schematic view of the lamp 300 of FIG. 25 in a support state; and FIG. 27 is a schematic view of the lamp 300 in a pivot state. The lamp 300 includes a light assembly 4 and the support structure 1. The support structure 1 support the light assembly 4.

In the embodiment, the support structure 1 can be the telescopic pivotable support structure 1 illustrated in any one of above-mentioned embodiments. The telescopic pivotable support structure 1 of the lamp 300 has been illustrated in detail in the above embodiments, here is merely a brief description.

In the embodiment, the support structure 1 includes a first pipe 11, a second pipe 12 and a first pivotable connection assembly 13. The first pivotable connection assembly 13 includes a first pivot part 131 and a second pivot part 132. The first pivot part 131 includes a first pivot portion 131a and a first connection portion 131b connected with the first pivot portion 131a. The first connection portion 131 is connected with one end of the first pipe 11. The second pivot part 132 includes a second pivot portion 132a and a second connection portion 132b connected with the second pivot portion 132a. The second connection portion 132b is connected with the second pipe 12. The first pivot portion 131a is pivotably connected with the second pivot portion 132a so as to make the support structure 1 telescopic and pivotable. The telescopic pivotable support structure 1 includes a support state, a pivot state and a retracted state, so that the fan body 6 of the lamp 300 can be supported at different heights, angles or positions, which is convenient used in different applicable scenarios and can improve user experience.

Referring to FIGS. 3-5, in the retracted state, the first pipe 11, the first pivot portion 131a and the second pivot portion 132a are accommodated in the second pipe 12 so that make a volume of the whole support structure 1 retracted to a volume of the second pipe 12. In the retracted state, the lamp 300 can be located on a desktop for use. In the support state, the first pipe 11 and the second pipe 12 extends in a same direction, at least part of the first pipe 11 extends out of the second pipe 12. Specifically, in at least one embodiment, in the support state, one part of the first pipe 11 extends out of the second pipe 12, the other part of the first pipe 11, the first pivot portion 131a and the second pivot portion 132a are accommodated in the second pipe 12; or the first pipe 11 and the first pivot portion 131a extend out of the second pipe 12; or, the first pipe 11, all the first pivot portion 131a and the second pivot portion 132a extend out of the second pipe 12. Furthermore, the first connection portion 131b is accommodated in one end of the first pipe 11; the second connection portion 132b is accommodated in the second pipe 12. In the support state, the lamp 300 can be used as a floor lamp, and a user can freely adjust a height of the lamp 300 by adjusting a length of the support structure 1. In the pivot state, among the first pipe 11, the first pivot portion 131a and the second pivot portion 132a, at least the first pipe 11 extends out of the second pipe 12, and the first pivot portion 131a is pivot relative to the second pivot portion 132a at a preset angle, which makes the first pivot portion 131a and the second pivot portion 132a connected in a pivot state through the first pivotable connection assembly 13. In the embodiment, in the pivot state, all the first pipe 11, the first pivot portion 131a and the second pivot portion 132a may extend out of the second pipe 12. In the pivot state, an illumination angle of the lamp 300 can be changed by adjusting the pivot angle, which is more convenient to use and improves the user experience.

In the embodiment, the telescopic pivotable support structure 1 makes the lamp 300 easy to store, carry and convenient for use on a desktop or the ground, which can be applicable in a variety of scenarios and improve the user experience.

The above description only describes embodiments of the present disclosure, and is not intended to limit the present disclosure, various modifications and changes can be made to the present disclosure. Any modifications, equivalent substitutions, improvements, etc. made within the spirit and scope of the present disclosure are intended to be included within the scope of the present disclosure.

What is claimed is:

1. A telescopic pivotable support structure, comprising:
a telescopic connecting pipe assembly, wherein the telescopic connecting pipe assembly comprises a first pipe, a second pipe and a first pivotable connection assembly, wherein the first pivotable connection assembly comprises a first pivot part and a second pivot part, the first pivot part comprises a first pivot portion and a first connection portion connected with the first pivot portion, the first connection portion is accommodated in one end of the first pipe to be connected with the first pipe; the second pivot part comprises a second pivot portion and a second connection portion, the second connection portion is configured to be connected with the second pipe, the second pivot portion is configured to be pivotably connected with the first pivot portion;
wherein the telescopic pivotable support structure comprises a support state, a pivot state and a retracted state, wherein:
in the retracted state, the first pipe, the first pivot portion and the second pivot portion are accommodated in the second pipe;
in the support state, the first pipe and the second pipe extend in a same direction, at least part of the first pipe extends out of the second pipe;
in the pivot state, among the first pipe, the first pivot portion and the second pivot portion, at least the first pipe extends out of the second pipe, and the first pivot portion is pivot at a preset angle relative to the second pivot portion so as to make the first pipe and the second pipe connected together and pivot relative to each other.

2. The telescopic pivotable support structure according to claim 1, wherein the first pivotable connection assembly further comprises an auxiliary pipe connected with the second connection portion, the auxiliary pipe is connected with the second pipe so as to connect the second connection portion with the second pipe, in the retracted state, the auxiliary pipe is accommodated in the second pipe.

3. The telescopic pivotable support structure according to claim 1, wherein one of the first pivot portion and the second pivot portion is provided with a stop portion, in the pivot state, the stop portion resists against the other of the first pivot portion and the second pivot portion.

4. The telescopic pivotable support structure according to claim 1, wherein the first pivot portion and the second pivot portion each defines at least one pivot hole, the first pivotable connection assembly further comprises a first pivot shaft, the first pivot shaft passes through the pivot hole of the first pivot portion and the pivot hole of the second pivot hole to pivotably connect the first pivot portion and the second pivot portion together, one of the first pivot portion and the second pivot portion comprises a first base and a second base opposite to the first base, each of the first base and the second base defines the pivot hole, at least part of the other of the first pivot portion and the second pivot portion is arranged between the first base and the second base, the first pivot shaft passes through the pivot hole of the first base, the pivot hole of the other of the first portion and the second pivot portion and goes into the pivot hole of the second base to pivotably connect the first pivot portion and the second pivot portion together, the other of the first pivot portion and the second pivot portion is provided with a stop portion, in the pivot state, the stop portion resists against one of the first base and the second base.

5. The telescopic pivotable support structure according to claim 4, wherein the number of the stop portion is two, in the pivot state, one of the two stop portions resists against the first base, the other of the two stop portions resists against the second base.

6. The telescopic pivotable support structure according to claim 4, the first pivot shaft comprise a first cap and a first shaft connected with the first cap, the first shaft passes through the pivot hole of the first pivot portion and the pivot hole of the second pivot portion, the first pivotable connection assembly further comprises a first fastener, wherein the first fastener is fixed at one end of the first shaft away from the first cap so that the first fastener and the first cap clamp the first pivot portion and the second pivot portion therebetween; the first pivotable connection assembly further comprises a first pad with a first through hole and a second pad with a second through hole, the other of the first pivot portion and the second pivot portion defines a groove at two opposite sides thereof, the first pad and the second pad are respectively received in the grooves on the two opposite sides, the first pivot shaft passes through the pivot hole of the first base, the first through hole, the pivot hole of the other of the first pivot portion and the second pivot portion, the second through hole and goes into the pivot hole of the second base to pivotably connect the first pivot portion and the second pivot portion together, the second base defines a first accommodating groove communicated with the pivot hole of the second base at a side thereof away from the first base, at least part of the first fastener is arranged in the first accommodating groove.

7. The telescopic pivotable support structure according to claim 1, the rigidity of the first pivot part and the second pivot part is greater than that of the first pipe and the second pipe.

8. The telescopic pivotable support structure according to claim 1, wherein the first pivot portion comprises a body and a limit portion connected between the body and the first connection portion, and wherein: the body is pivotably connected with the second pivot portion, the limit portion together with the first connection portion forms a step structure, the first connection portion is accommodated in the first pipe and an end of the first pipe resists against the limit portion.

9. The telescopic pivotable support structure according to claim 1, wherein the first pivotable connection assembly further comprises at least one position member clamped between the second connection portion and an inner wall of the second pipe, wherein: the at least one position member is arc-shaped; the first pivotable connection assembly further comprises a limit sleeve arranged at one end of the second pipe adjacent to the first pipe, the limit sleeve sleeves on an outer periphery of the second pipe and is configured to prevent the second connection portion from detaching from the second pipe.

10. The telescopic pivotable support structure according to claim 1, wherein the first pipe is connected together with the first connection portion through a stamping process, and the outer surface of the first pipe is provided with a stamping groove or a stamping hole.

11. The telescopic pivotable support structure according to claim 1, further comprising a first connecting pipe assembly telescopically connected with one end of the first pipe away from the second pipe and a second connecting pipe assembly telescopically connected with one end of the second pipe away from the first pipe.

12. The telescopic pivotable support structure according to claim 1, wherein the first connection portion is configured to rotate at one end of the first pipe, such that the first pivotable connection assembly and the second pipe rotate relative to the first pipe; and/or the second connection portion is configured to rotate at one end of the second pipe, such that the first pivotable connection assembly and the first pipe to rotate relative to the second pipe.

13. A camera support device, comprising:
a holding structure, configured to hold a camera device thereon; and
a telescopic pivotable support structure, configure to support the holding structure, wherein the telescopic pivotable support structure comprises:
a telescopic connecting pipe assembly, wherein the telescopic connecting pipe assembly comprises a first pipe, a second pipe and a first pivotable connection assembly, wherein the first pivotable connection assembly comprises a first pivot part and a second pivot part, the first pivot part comprises a first pivot portion and a first connection portion connected with the first pivot portion, the first connection portion is accommodated in one end of the first pipe to be connected with the first pipe; the second pivot part comprises a second pivot portion and a second connection portion, the second connection portion is configured to be connected with the second pipe, the second pivot portion is configured to be pivotably connected with the first pivot portion;
wherein the telescopic pivotable support structure comprises a support state, a pivot state and a retracted state, wherein:
in the retracted state, the first pipe, the first pivot portion and the second pivot portion are accommodated in the second pipe;
in the support state, the first pipe and the second pipe extend in a same direction, at least part of the first pipe extends out of the second pipe;
in the pivot state, among the first pipe, the first pivot portion and the second pivot portion, at least the first pipe extends out of the second pipe, and the first pivot portion is pivot at a preset angle relative to the second pivot portion so as to make the first pipe and the second pipe connected together and pivot relative to each other.

14. The camera support device according to claim 13, further comprising a second pivotable connection assembly, wherein the second pivotable connection assembly is configured to be connected between the holding structure and the telescopic pivotable support structure so as to allow the holding structure to rotate relative to the telescopic pivotable support structure, the second pivotable connection assembly further comprises a third pivot part and a fourth pivot part, the third pivot part comprises a third pivot portion and a third connection portion connected with the third pivot portion, the third connection portion is configured to be connected with the telescopic pivotable support structure, the fourth pivot part comprises a fourth pivot portion and a fourth connection portion connected with the fourth pivot portion, the third pivot portion is pivotably connected with the fourth pivot portion, the fourth connection portion is configured to be connected with the holding structure.

15. The camera support device according to claim 14, wherein the third connection portion further comprises a first rotatable portion connected with the third pivot portion and a second rotatable portion connected with the telescopic pivotable support portion, the first rotatable portion is rotatably connected with the second rotatable portion so as to allow the third connection portion to bring the third pivot portion, the fourth pivot part, and the holding structure to rotate around an axis defined by an extension direction of the second pipe.

16. The camera support device according to claim 15, further comprising a lighting assembly connected with the fourth pivot part, and the fourth pivot part is capable of bringing the holding structure and the lighting assembly to rotate relative to the third pivot part and the telescopic pivotable support device.

17. A fan, comprising:
a fan body; and
a telescopic pivotable support structure configured to support the fan body, wherein the telescopic pivotable support structure comprises:
a telescopic connecting pipe assembly, wherein the telescopic connecting pipe assembly comprises a first pipe, a second pipe and a first pivotable_connection assembly, wherein the first pivotable connection assembly comprises a first pivot part and a second pivot part, the first pivot part comprises a first pivot portion and a first connection portion connected with the first pivot portion, the first connection portion is accommodated in one end of the first pipe to be connected with the first pipe; the second pivot part comprises a second pivot portion and a second connection portion, the second connection portion is configured to be connected with the second pipe, the second pivot portion is configured to be pivotably connected with the first pivot portion;
wherein the telescopic pivotable support structure comprises a support state, a pivot state and a retracted state, wherein:
in the retracted state, the first pipe, the first pivot portion and the second pivot portion are accommodated in the second pipe;
in the support state, the first pipe and the second pipe extend in a same direction, at least part of the first pipe extends out of the second pipe;
in the pivot state, among the first pipe, the first pivot portion and the second pivot portion, at least the first pipe extends out of the second pipe, and the first pivot portion is pivot at a preset angle relative to the second pivot portion so as to make the first pipe and the second pipe connected together and pivot relative to each other.

18. The fan according to claim 17, further comprising a second pivotable connection assembly, wherein the second pivotable connection assembly is configured to be connected between the holding structure and the telescopic pivotable support structure so as to allow the holding structure to rotate relative to the telescopic pivotable support structure, the second pivotable connection assembly further comprises a third pivot part and a fourth pivot part, the third pivot part comprises a third pivot portion and a third connection portion connected with the third pivot portion, the third connection portion is configured to be connected with the telescopic pivotable support structure, the fourth pivot part comprises a fourth pivot portion and a fourth connection portion connected with the fourth pivot portion, the third pivot portion is pivotably connected with the fourth pivot portion, the fourth connection portion is configured to be connected with the holding structure, wherein the third connection portion further comprises a first rotatable portion connected with the third pivot portion and a second rotatable portion connected with the telescopic pivotable support portion, the first rotatable portion is rotatably connected with the second rotatable portion so as to allow the third connection portion to bring the third pivot portion, the fourth pivot part, and the holding structure to rotate around an axis defined by an extension direction of the second pipe.

19. A lamp, comprising:

a lamp body; and a telescopic pivotable support structure configured to support the lamp body, wherein the telescopic pivotable support structure comprises:

a telescopic connecting pipe assembly, wherein the telescopic connecting pipe assembly comprises a first pipe, a second pipe and a first pivotable connection assembly, wherein the first pivotable connection assembly comprises a first pivot part and a second pivot part, the first pivot part comprises a first pivot portion and a first connection portion connected with the first pivot portion, the first connection portion is accommodated in one end of the first pipe to be connected with the first pipe; the second pivot part comprises a second pivot portion and a second connection portion, the second connection portion is configured to be connected with the second pipe, the second pivot portion is configured to be pivotably connected with the first pivot portion;

wherein the telescopic pivotable support structure comprises a support state, a pivot state and a retracted state, wherein:

in the retracted state, the first pipe, the first pivot portion and the second pivot portion are accommodated in the second pipe;

in the support state, the first pipe and the second pipe extend in a same direction, at least part of the first pipe extends out of the second pipe;

in the pivot state, among the first pipe, the first pivot portion and the second pivot portion, at least the first pipe extends out of the second pipe, and the first pivot portion is pivot at a preset angle relative to the second pivot portion so as to make the first pipe and the second pipe connected together and pivot relative to each other.

20. The lamp according to claim 19, further comprising a second pivotable connection assembly, wherein the second pivotable connection assembly is configured to be connected between the holding structure and the telescopic pivotable support structure so as to allow the holding structure to rotate relative to the telescopic pivotable support structure, the second pivotable connection assembly further comprises a third pivot part and a fourth pivot part, the third pivot part comprises a third pivot portion and a third connection portion connected with the third pivot portion, the third connection portion is configured to be connected with the telescopic pivotable support structure, the fourth pivot part comprises a fourth pivot portion and a fourth connection portion connected with the fourth pivot portion, the third pivot portion is pivotably connected with the fourth pivot portion, the fourth connection portion is configured to be connected with the holding structure; the third connection portion further comprises a first rotatable portion connected with the third pivot portion and a second rotatable portion connected with the telescopic pivotable support portion, the first rotatable portion is rotatably connected with the second rotatable portion so as to allow the third connection portion to bring the third pivot portion, the fourth pivot part, and the holding structure to rotate around an axis defined by an extension direction of the second pipe.

\* \* \* \* \*